US009012066B2

(12) United States Patent
Hirose et al.

(10) Patent No.: US 9,012,066 B2
(45) Date of Patent: Apr. 21, 2015

(54) ANODE AND SECONDARY BATTERY

(75) Inventors: Takakazu Hirose, Fukushima (JP);
Kenichi Kawase, Fukushima (JP);
Kazunori Noguchi, Fukushima (JP);
Takayuki Fujii, Fukushima (JP)

(73) Assignee: Sony Corporation, Tokyo (JP)

( * ) Notice: Subject to any disclaimer, the term of this patent is extended or adjusted under 35 U.S.C. 154(b) by 634 days.

(21) Appl. No.: 12/419,778

(22) Filed: Apr. 7, 2009

(65) Prior Publication Data
US 2009/0253033 A1 Oct. 8, 2009

(30) Foreign Application Priority Data
Apr. 8, 2008 (JP) .................................. 2008-100186

(51) Int. Cl.
| | |
|---|---|
| H01M 4/02 | (2006.01) |
| H01M 10/052 | (2010.01) |
| H01M 4/134 | (2010.01) |
| H01M 4/1395 | (2010.01) |
| H01M 4/36 | (2006.01) |
| H01M 10/0568 | (2010.01) |
| H01M 10/0569 | (2010.01) |
| H01M 10/0587 | (2010.01) |

(52) U.S. Cl.
CPC ............ *H01M 10/052* (2013.01); *H01M 4/134* (2013.01); *H01M 4/1395* (2013.01); *H01M 4/364* (2013.01); *H01M 10/0568* (2013.01); *H01M 10/0569* (2013.01); H01M 10/0587 (2013.01); H01M 2004/021 (2013.01); Y02E 60/122 (2013.01)

(58) Field of Classification Search
None
See application file for complete search history.

(56) References Cited

U.S. PATENT DOCUMENTS

| | | | | |
|---|---|---|---|---|
| 2002/0094477 | A1* | 7/2002 | Sasaki et al. ................... | 429/161 |
| 2002/0110731 | A1* | 8/2002 | Coustier et al. ............... | 429/144 |
| 2004/0191622 | A1* | 9/2004 | Han et al. ....................... | 429/181 |
| 2004/0214085 | A1* | 10/2004 | Sheem et al. ............... | 429/218.1 |
| 2006/0115735 | A1* | 6/2006 | Yasuda et al. ................. | 429/233 |
| 2006/0127773 | A1* | 6/2006 | Kawakami et al. ........... | 429/245 |
| 2006/0216605 | A1* | 9/2006 | Shirakata et al. ........ | 429/231.95 |
| 2006/0263697 | A1* | 11/2006 | Dahn et al. ..................... | 429/336 |
| 2007/0072075 | A1* | 3/2007 | Gan et al. ....................... | 429/209 |

FOREIGN PATENT DOCUMENTS

| | | |
|---|---|---|
| JP | 11-339777 | 12/1999 |
| JP | 11-339778 | 12/1999 |
| JP | 2004-071305 | 3/2004 |

(Continued)

OTHER PUBLICATIONS

Japanese Patent Office, Office Action issued in Patent Application JP 2008-100186, on Aug. 25, 2010.

*Primary Examiner* — Patrick Ryan
*Assistant Examiner* — Wyatt McConnell
(74) *Attorney, Agent, or Firm* — Dentons US LLP

(57) ABSTRACT

A secondary battery capable of improving the cycle characteristics and the swollenness characteristics is provided. The secondary battery includes a cathode, an anode, and an electrolytic solution. The anode includes an anode active material layer having a plurality of fine pores on an anode current collector. The anode active material layer contains an anode active material and an anode binder. A change rate of a mercury intrusion into the plurality of fine pores measured by mercury penetration technique is distributed to show a peak in the pore diameter range from 30 nm to 10000 nm, both inclusive.

16 Claims, 18 Drawing Sheets

(56) References Cited

FOREIGN PATENT DOCUMENTS

| | | |
|---|---|---|
| JP | 2005-293899 | 10/2005 |
| JP | 2007-018882 A | 1/2007 |
| JP | 2007-027008 A | 2/2007 |
| JP | 2008-016196 A | 1/2008 |
| WO | 2006/129756 A1 | 12/2006 |
| WO | 2007/094240 A1 | 8/2007 |
| WO | 2008/026595 A1 | 3/2008 |

* cited by examiner

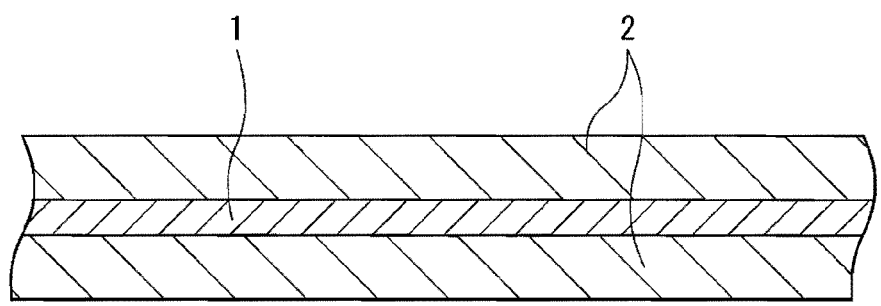
F I G. 1

ANODE AND SECONDARY BATTERY

BACKGROUND OF THE INVENTION

1. Field of the Invention

The present invention relates to an anode having an anode active material layer on an anode current collector and a secondary battery including the anode.

2. Description of the Related Art

In recent years, portable electronic devices such as video cameras, mobile phones, and notebook personal computers have been widely used, and it is strongly demanded to reduce their size and weight and to achieve their long life. Accordingly, as an electric power source for the portable electronic devices, a battery, in particular a light-weight secondary batter capable of providing a high energy density has been developed.

Specially, a secondary battery using insertion and extraction of lithium for charge and discharge reaction (so-called lithium ion secondary battery) is extremely prospective, since such a secondary battery provides a higher energy density than a lead battery and a nickel cadmium battery.

The lithium ion secondary battery includes a cathode, an anode, and an electrolytic solution. The anode has an anode active material layer on an anode current collector. The anode active material layer contains an anode active material contributing to charge and discharge reaction. The anode active material layer may contain other material such as an anode binder according to needs. It is known that fine pores (void) of varying size exist in the anode active material layer as described in, for example, Japanese Unexamined Patent Application Publication Nos. 2005-293899 and 2004-071305.

As the anode active material, a carbon material has been widely used. However, in recent years, as the high performance and the multi functions of the portable electronic devices are developed, further improvement of the battery capacity is demanded. Thus, it has been considered to use silicon or the like instead of the carbon material. Since the theoretical capacity of silicon (4199 mAh/g) is significantly higher than the theoretical capacity of graphite (372 mAh/g), it is prospected that the battery capacity is thereby highly improved.

In the case where silicon powder is used as an anode active material, coating method, sintering method or the like is used as a method of forming an anode active material layer as described in, for example, Japanese Unexamined Patent Application Publication Nos. 11-339777 and 11-339778. In the coating method, after slurry containing the anode active material, an anode binder and the like is prepared, the surface of an anode current collector is coated with the slurry and then the resultant is dried. In the sintering method, after the surface of the anode current collector is coated with the foregoing slurry and the resultant is dried, heat treatment (firing) is provided. In the case where the coating method or the sintering method is used, pressing is performed after slurry coating according to needs.

However, in the case where silicon is used as an anode active material, the anode active material layer is intensely expanded and shrunk in charge and discharge. Thus, the anode active material layer may be dropped from the anode current collector. Further, in charge and discharge, adjacent anode active materials collide each other to generate strain (internal stress) in the anode active material layer. Thus, the apparent thickness of the anode active material layer may be increased. Thereby, while a high capacity of the battery capacity is obtained, there is a possibility that the cycle characteristics as important characteristics of the secondary battery are lowered and the thickness thereof is unintentionally increased.

SUMMARY OF THE INVENTION

In these years, the high performance and the multi functions of the portable electronic devices are increasingly developed, and the electric power consumption tends to be increased. Accordingly, charge and discharge of the secondary battery are frequently repeated, and thus the cycle characteristics are easily lowered. Therefore, further improvement of the cycle characteristics of the secondary battery has been aspired. In this case, to normally load the secondary battery and safely use a portable electronic device, it is also important to suppress an increase in the thickness of the secondary battery associated with repeated use.

In view of the foregoing, in the invention, it is desirable to provide an anode and a secondary battery capable of improving the cycle characteristics and the swollenness characteristics.

According to an embodiment of the invention, there is provided an anode including an anode active material layer having a plurality of fine pores on an anode current collector. The anode active material layer contains an anode active material and an anode binder, and a change rate of mercury intrusion into the plurality of fine pores measured by mercury penetration technique is distributed to show a peak in a pore diameter range from 30 nm to 10000 nm, both inclusive.

According to an embodiment of the invention, there is provided a secondary battery including a cathode, an anode, and, an electrolytic solution. The anode includes an anode active material layer having a plurality of fine pores on an anode current collector. The anode active material layer contains an anode active material and an anode binder. The change rate of mercury intrusion into the plurality of fine pores measured by mercury penetration technique is distributed to show a peak in the pore diameter range from 30 nm to 10000 nm, both inclusive.

The foregoing "mercury intrusion measured by mercury penetration technique" is a mercury intrusion measured by using a mercury porosimeter. More specifically, the mercury intrusion is a value measured under the conditions that the surface tension of mercury is 485 mN/m, the contact angle of mercury is 130 deg, and the relation between a pore diameter of the fine pores and a pressure is approximated as 180/pressure=pore diameter. Accordingly, "to show a peak in the pore diameter range from 30 nm to 10000 nm, both inclusive" means that a peak exists in the pore diameter range from 30 nm to 10000 nm, both inclusive in the measurement result with the use of the mercury porosimeter (horizontal axis: pore diameter; and vertical axis: change rate of mercury intrusion). The peak existing in the pore diameter range may be one or more.

According to the anode of the embodiment of the invention, the anode active material layer containing the anode active material and the anode binder has the plurality of fine pores, and the change rate of mercury intrusion into the plurality of fine pores measured by mercury penetration technique is distributed to show a peak in the pore diameter range from 30 nm to 10000 nm. In this case, compared to a case that a peak is not shown in the foregoing pore diameter range, in electrode reaction, expansion and shrinkage of the anode active material layer are prevented, and internal stress associated therewith is relaxed. Thereby, according to the secondary battery including the anode of the embodiment of the invention, in charge and discharge, dropping of the anode active material layer is prevented and increase of the thickness thereof is prevented, and thereby the cycle characteristics and the swollenness characteristics are able to be improved. In this case, when the change rate of mercury intrusion shows a peak in the pore diameter range from 100 nm to 5000 nm, both inclusive, higher effect is obtainable.

Other and further objects, features and advantages of the invention will appear more fully from the following description.

BRIEF DESCRIPTION OF THE DRAWINGS

FIG. 1 is a cross sectional view illustrating a structure of an anode according to an embodiment of the invention;

DETAILED DESCRIPTION OF THE PREFERRED EMBODIMENT

Figure 2:
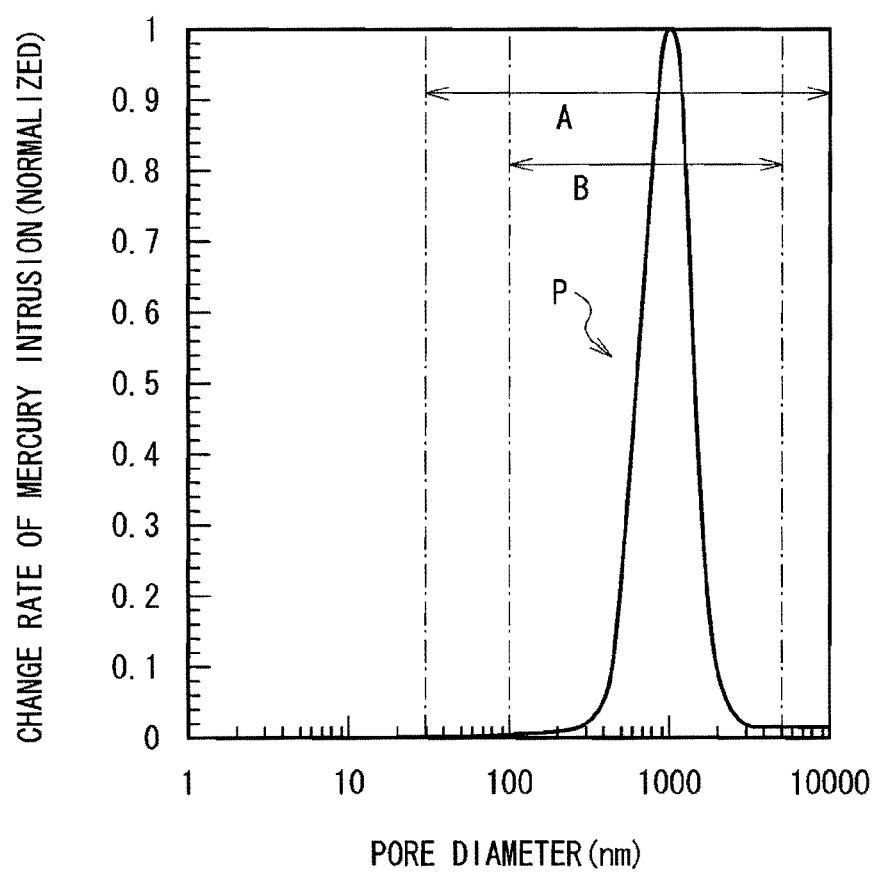
FIG. 2 is a diagram illustrating a distribution of a change rate of mercury intrusion.

An embodiment of the invention will be hereinafter described in detail with reference to the drawings.

FIG. 1 illustrates a cross sectional structure of an anode according to an embodiment of the invention. The anode is used, for example, for an electrochemical device such as a secondary battery. The anode has an anode current collector 1 having a pair of opposed faces and an anode active material layer 2 provided thereon.

The anode current collector 1 is preferably made of a metal material having favorable electrochemical stability, a favorable electric conductivity, and a favorable mechanical strength. As such a metal material, for example, copper, nickel, stainless and the like are included. Specially, copper is preferable, since thereby a high electric conductivity is able to be obtained.

In particular, the metal material preferably has one or more metal elements not forming an intermetallic compound with an electrode reactant. In the case where the intermetallic compound is formed with the electrode reactant, there is a possibility that in operating an electrochemical device (for example, in charging and discharging a secondary battery), being influenced by a stress due to expansion and shrinkage of the anode active material layer 2, current collectivity is lowered, or the anode active material layer 2 is separated from the anode current collector 1. As such a metal element, for example, copper, nickel, titanium, iron, chromium and the like are included.

Further, the metal material preferably has one or more metal elements being alloyed with the anode active material layer 2. Thereby, adhesion between the anode current collector 1 and the anode active material layer 2 is improved, and thus the anode active material layer 2 is hardly separated from the anode current collector 1. As a metal element that does not form the intermetallic compound with the electrode reactant and that is alloyed with the anode active material layer 2, for example, in the case where the anode active material layer 2 contains silicon as an anode active material, copper, nickel, iron and the like are included. These metal elements are preferable in terms of strength and electric conductivity as well.

The anode current collector 1 may have a single layer structure or a multilayer structure. In the case where the anode current collector 1 has the multilayer structure, for example, it is preferable that the layer adjacent to the anode active material layer 2 is made of a metal material being alloyed with the anode active material layer 2, and layers not adjacent to the anode active material layer 2 are made of other metal material.

The surface of the anode current collector 1 is preferably roughened. Thereby, due to the so-called anchor effect, the adhesion between the anode current collector 1 and the anode active material layer 2 is improved. In this case, it is enough that at least the surface of the anode current collector 1 opposed to the anode active material layer 2 is roughened. As a roughening method, for example, a method of forming fine particles by electrolytic treatment and the like are included. The electrolytic treatment is a method of providing concavity and convexity by forming the fine particles on the surface of the anode current collector 1 by electrolytic method in an electrolytic bath. A copper foil formed by using the electrolytic method is generally called "electrolytic copper foil."

Ten point height of roughness profile Rz of the surface of the anode current collector 1 is preferably in the range from 0.5 µm to 6.5 µm, both inclusive, since thereby the adhesion between the anode current collector 1 and the anode active material layer 2 is further improved. More specifically, in the case where the ten point height of roughness profile Rz is smaller than 0.5 µm, there is a possibility that sufficient adhesion is not obtained. Meanwhile, in the case where the ten point height of roughness profile Rz is larger than 6.5 μm, the adhesion may decrease.

The anode active material layer 2 contains an anode active material and an anode binder. The anode active material layer 2 is provided, for example, on both faces of the anode current collector 1. However, the anode active material layer 2 may be provided on only a single face of the anode current collector 1.

The anode active material layer 2 has a plurality of fine pores (void) therein. The pore diameter of the plurality of fine pores distributes in a wide range from about several nm to several thousand nm.

Figure 3:
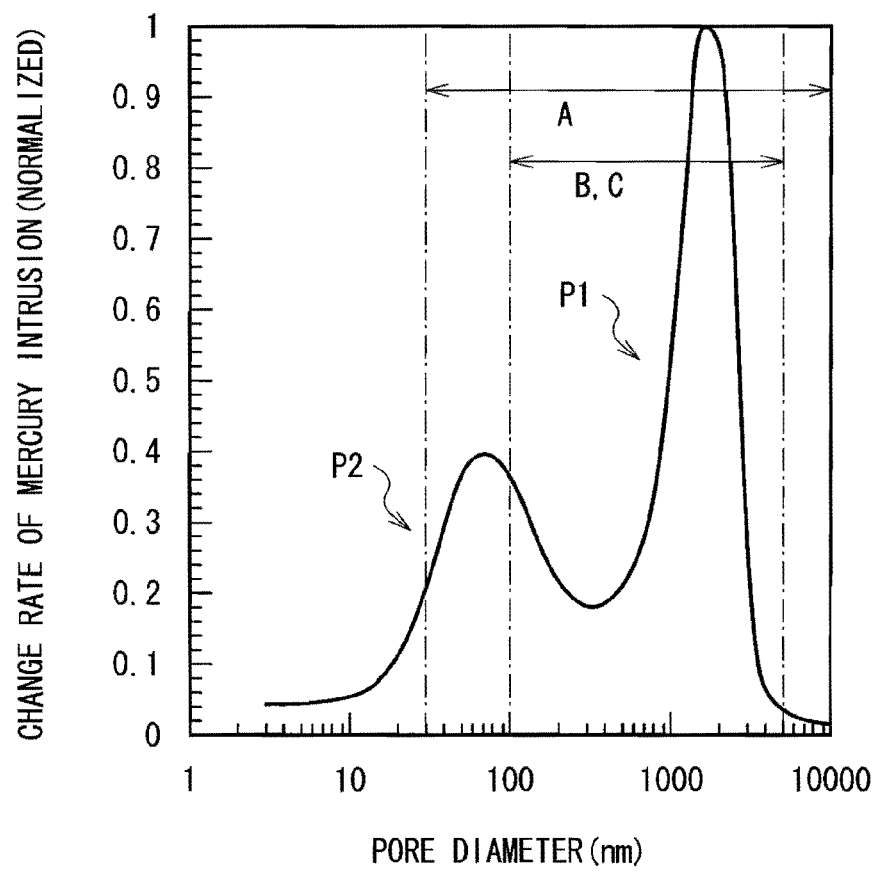
FIG. 3 is a diagram illustrating another distribution of a change rate of mercury intrusion.

FIG. 2 and FIG. 3 illustrate a distribution of change rate of mercury intrusion into the plurality of fine pores measured by mercury penetration technique. The horizontal axis indicates a pore diameter (nm), and the vertical axis indicates a change rate of mercury intrusion, respectively. The change rate of mercury intrusion is measured by using a mercury porosimeter. More specifically, the mercury intrusion is a value measured under the conditions that the surface tension of mercury is 485 mN/m, the contact angle of mercury is 130 deg, and the relation between a pore diameter of the fine pores and a pressure is approximated as 180/pressure=pore diameter.

When mercury intrusion V into the plurality of fine pores is measured while pressure P is gradually increased by using the mercury porosimeter, change rate of the mercury intrusion ($\Delta V/\Delta P$) distributes to show 1 or more peaks in the pore diameter range from 3 nm to 10000 nm, both inclusive, measurable by using the mercury porosimeter. For example, FIG. 2 illustrates a case that only one peak P (pore diameter of the peak P is about 1000 nm) is shown, and FIG. 3 illustrates a case that a plurality of (two) peaks P1 and P2 (pore diameters of the peaks P1 and P2 are about 1100 nm and about 80 nm, respectively) are shown. The change rates of mercury intrusion indicated by the vertical axis in FIG. 2 and FIG. 3 are normalized values where the change rate in the maximum peak (peak representing the maximum value) is 1.

The change rate of mercury intrusion distributes to show a peak in the pore diameter range from 30 nm to 10000 nm, both inclusive, (pore diameter range A illustrated in FIG. 2 and FIG. 3) irrespective of the total number of peaks. Thereby, the fine pore distribution becomes appropriate in the anode active material layer 2, and thus the plurality of fine pores effectively function as a spare space in electrode reaction. Thereby, in the electrode reaction, expansion and shrinkage of the anode active material layer 2 are prevented, and the internal stress associated therewith is relaxed. The number of peaks shown in the foregoing pore diameter range (from 30 nm to 10000 nm, both inclusive) may be one or more.

In this case, the change rate of mercury intrusion preferably shows a peak in the pore diameter range from 100 nm to 5000 nm, both inclusive (pore diameter range B illustrated in FIG. 2 and FIG. 3). Thereby, the fine pore distribution in the anode active material layer 2 becomes more appropriate, and thus higher effect is obtained.

In determining the pore diameter range in which the change rate of mercury intrusion shows a peak, the pore diameter range is determined as the range from 30 nm to 10000 nm, both inclusive as described above. This is because a cubic capacity of a fine pore having a relatively large pore diameter is appropriate as the foregoing spare space, and securing the spare space largely affects prevention of expansion and shrinkage of the anode active material layer 2 and relax of the internal stress associated therewith. More specifically, in the case where the pore diameter is smaller than 30 nm, the pore diameter of the fine pore is too small and thus the fine pore is difficult to function as a spare space effectively. Meanwhile, in the case where the pore diameter is larger than 10000 nm, the pore diameter of the fine pore is too large and thus the binding characteristics between the anode active materials are lowered.

As illustrated in FIG. 3, in the case where the change rate of mercury intrusion shows a plurality of peaks, the maximum peak (peak P1) among the peaks preferably exists in the pore diameter range from 100 nm to 5000 nm, both inclusive (pore diameter range C illustrated in FIG. 3). In this case, compared to a case that the maximum peak exists in a range out of the foregoing pore diameter range, in electrode reaction, expansion and shrinkage of the anode active material layer 2 are prevented, and the internal stress associated therewith is relaxed.

The occupation ratio of the fine pores (void) in the anode active material layer 2, that is, the porosity is preferably in the range from 4% to 70%, both inclusive, and more preferably in the range from 20% to 30%, both inclusive. Thereby, the absolute amount of the fine pores existing in the anode active material layer 2 becomes appropriate, and both the occupation space of the anode active material and the occupation space (spare space) of the fine pores are secured, and thus higher effect is able to be obtained. More specifically, in the case where the porosity is smaller than 4%, there is a possibility that the spare space is not sufficiently obtained. Meanwhile, in the case where the porosity is larger than 70%, the occupancy ratio of the anode active material is lowered, and thus there is a possibility that an electric performance of an electrochemical device (for example, a battery capacity of the secondary battery) is not sufficiently obtained.

The foregoing porosity of the anode active material layer 2 is measured by using a measurement function of the mercury porosimeter. As the mercury porosimeter having such a measurement function, for example, the mercury porosimeter manufactured by Micromeritics Instrument Corporation (Autopore 9500 series) and the like are included. The porosity is calculated based on the mercury intrusion in measuring the change rate of mercury intrusion into the plurality of fine pores described above.

The anode active material layer 2 contains one or more anode materials capable of inserting and extracting the electrode reactant as an anode active material. As the anode material, a material having silicon as an element is preferable, since such a material has high ability to insert and extract the electrode reactant and thus a high energy density is obtainable. Such an anode material may be a simple substance, an alloy, or a compound of silicon, or may have one or more phases thereof at least in part. One thereof may be used singly, or a plurality thereof may be used by mixture.

"Alloys" in the invention include an alloy containing one or more metal elements and one or more metalloid elements, in addition to an alloy composed of two or more metal elements. It is needless to say that "alloys" in the invention may contain a nonmetallic element. The texture thereof includes a solid solution, a eutectic crystal (eutectic mixture), an intermetallic compound, and a texture in which two or more thereof coexist.

As the alloy of silicon, for example, an alloy containing at least one selected from the group consisting of tin (Sn), nickel, copper, iron, cobalt, manganese (Mn), zinc, indium (In), silver (Ag), titanium, germanium (Ge), bismuth (Bi), antimony (Sb), and chromium as an element other than silicon is included.

As the compound of silicon, for example, a compound containing oxygen and carbon (C) as an element other than silicon is included. Further, the compound of silicon may contain one or more of the elements described for the alloy of silicon as an element other than silicon.

The anode active material is in a state of a plurality of particles. The average particle diameter of the anode active material (so-called median size) is preferably from 0.5 µm to 20 µm, both inclusive, since thereby the particle size distribution of the anode active material becomes appropriate, and thus higher effect is obtained. More specifically, in the case where the median size is smaller than 0.5 µm, the surface area of the anode active material may be excessively increased. Meanwhile, in the case where the median size is larger than 20 µm, the binding characteristics of the anode active material are easily lowered, the internal stress generated in the anode active material layer 2 in electrode reaction is difficult to be relaxed, and thus the anode active material layer 2 may easily fall. Further, the anode active material becomes easily broken, and thus the surface area may be increased.

The anode active material may contain other material capable of inserting and extracting the electrode reactant in addition to the material having silicon as an element. As such a material, for example, a material that is able to insert and extract the electrode reactant and that contains at least one of metal elements and metalloid elements as an element (except for the material having silicon as an element) is included. Such a material is preferably used, since thereby a high energy density is obtainable. The material may be a simple substance, an alloy, or a compound of a metal element or a metalloid element, or may have one or more phases thereof at least in part.

As the foregoing metal element or the foregoing metalloid element, for example, a metal element or a metalloid element capable of forming an alloy with the electrode reactant is included. Specifically, magnesium (Mg), boron, aluminum, gallium (Ga), indium, germanium, tin, lead (Pb), bismuth, cadmium (Cd), silver (Ag), zinc, hafnium (Hf), zirconium (Zr), yttrium (Y), palladium (Pd), platinum (Pt) and the like are included. Specially, tin is preferable. Tin has a high ability to insert and extract the electrode reactant, and provides a high energy density. As a material containing tin, for example, a simple substance, an alloy, or a compound of tin, or a material having one or more phases thereof at least in part is included.

As the alloy of tin, for example, an alloy containing at least one selected from the group consisting of silicon, nickel, copper, iron, cobalt, manganese, zinc, indium, silver, titanium, germanium, bismuth, antimony, and chromium as an element other than tin is included. As a compound of tin, for example, a compound containing oxygen or carbon as an element other than tin is included. The compound of tin may contain one or more of the elements described for the alloy of tin as an element other than tin. Examples of the alloy or the compound of tin include $SnSiO_3$, $LiSnO$, $Mg_2Sn$ and the like.

In particular, as the material having tin, for example, a material having a second element and a third element in addition to tin as a first element is preferable. The second element is at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon. The third element is at least one selected from the group consisting of boron, carbon, aluminum, and phosphorus (P). In the case where the second element and the third element are contained, the cycle characteristics are improved.

Specially, a SnCoC-containing material that contains tin, cobalt, and carbon as an element in which the carbon content is in the range from 9.9 wt % to 29.7 wt %, both inclusive, and the cobalt ratio to the total of tin and cobalt (Co/(Sn+Co)) is in the range from 30 wt % to 70 wt %, both inclusive is preferable. In such a composition range, a high energy density is obtained.

The SnCoC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effect is obtained.

The SnCoC-containing material has a phase containing tin, cobalt, and carbon. Such a phase is preferably a low crystalline phase or an amorphous phase. The phase is a reaction phase capable of being reacted with the electrode reactant, and superior cycle characteristics are thereby obtained. The half-width of the diffraction peak obtained by X-ray diffraction of the phase is preferably 1.0 deg or more based on diffraction angle of 2θ in the case where CuKα ray is used as a specific X ray, and the sweep rate is 1 deg/min. Thereby, lithium is more smoothly inserted and extracted, and reactivity with the electrolyte is decreased.

It is easily determined whether or not the diffraction peak obtained by X-ray diffraction of the phase corresponds to the reaction phase capable of being reacted with lithium by comparing an X-ray diffraction chart before the electrochemical reaction with lithium to an X-ray diffraction chart after the electrochemical reaction with lithium. For example, if the diffraction peak position after the electrochemical reaction with lithium is changed from the diffraction peak position before the electrochemical reaction with lithium, the diffraction peak obtained by X-ray diffraction of the phase corresponds to the reaction phase capable of being reacted with lithium. In this case, for example, the diffraction peak of the low crystalline or amorphous reaction phase is observed in the range from 2θ=20 deg to 50 deg. The low crystalline or amorphous reaction phase contains, for example, the foregoing respective elements. It is considered that the low crystalline or amorphous reaction phase is mainly realized by carbon.

The SnCoC-containing material may have a phase containing a simple substance of each element or part thereof, in addition to the low crystalline or the amorphous phase.

In particular, in the SnCoC-containing material, at least part of carbon as an element is preferably bonded to a metal element or a metalloid element as other element. Cohesion or crystallization of tin or the like is thereby prevented.

As a measurement method for examining bonding state of elements, for example, X-ray Photoelectron Spectroscopy (XPS) is included. XPS is a method for examining element composition and element bonding state in the region up to several nm from the sample surface by irradiating the sample surface with soft X ray (in a commercial device, Al—Kα ray or Mg—Kα ray is used) and measuring motion energy of a photoelectron jumping out from the sample surface.

The bound energy of an inner orbit electron of an element is changed correlatively to the charge density on the element in the first approximation. For example, in the case where the charge density of carbon element is decreased by interaction with an element existing in the vicinity thereof, an outer electron such as 2p electron is decreased, and thus 1s electron of carbon element is subject to strong binding force by the shell. That is, in the case where the charge density of the element is decreased, the bound energy becomes high. In XPS, in the case where the bound energy becomes high, the peak is shifted to a higher energy region.

In XPS, in the case of graphite, the peak of 1s orbit of carbon (C1s) is observed at 284.5 eV in the apparatus in which energy calibration is made so that the peak of 4f orbit of gold atom (Au4f) is obtained in 84.0 eV. In the case of surface contamination carbon, the peak is observed at 284.8 eV. Meanwhile, in the case of higher charge density of carbon element, for example, in the case where carbon is bonded to an element that is more positive than carbon, the peak of C1s is observed in the region lower than 284.5 eV That is, in the case where at least part of carbon contained in the SnCoC-containing material is bonded to the metal element, the metalloid element or the like as other element, the peak of the composite wave of C1s obtained for the SnCoC-containing material is observed in the region lower than 284.5 eV.

In performing XPS measurement, in the case where the surface is covered with surface contamination carbon, the surface is preferably slightly sputtered by an argon ion gun attached to an XPS device. Further, if the SnCoC-containing material as a measuring target exists in the anode 22, it is preferable that after the secondary battery is disassembled and the anode 22 is taken out, the anode 22 is washed with a volatile solvent such as dimethyl carbonate in order to remove a low volatile solvent and an electrolyte salt existing on the surface of the anode 22. Such sampling is desirably performed under the inert atmosphere.

Further, in XPS measurement, for example, the peak of C1s is used for correcting the energy axis of spectrums. Since surface contamination carbon generally exists on a material surface, the peak of C1s of the surface contamination carbon is set to in 284.8 eV, which is used as an energy reference. In XPS measurement, the waveform of the peak of C1s is obtained as a form including the peak of the surface contamination carbon and the peak of carbon in the SnCoC-containing material. Therefore, for example, by performing analysis by using commercially available software, the peak of the surface contamination carbon and the peak of carbon in the SnCoC-containing material are separated. In the analysis of the waveform, the position of the main peak existing on the lowest bound energy side is set to the energy reference (284.8 eV).

The SnCoC-containing material may be formed by, for example, mixing raw materials of respective elements, dissolving the resultant mixture in an electric furnace, a high frequency induction furnace, an arc melting furnace or the like and then solidifying the resultant. Otherwise, the SnCoC-containing material may be formed by various atomization methods such as gas atomizing and water atomizing; various roll methods; or a method using mechanochemical reaction such as mechanical alloying method and mechanical milling method. Specially, the method using mechanochemical reaction is preferable, since thereby the SnCoC-containing material becomes the low crystalline structure or the amorphous structure. In the method using the mechanochemical reaction, for example, a manufacturing apparatus such as a planetary ball mill apparatus and an attliter may be used.

As the raw material, a mixture of simple substances of the respective elements may be used, but an alloy is preferably used for part of elements other then carbon. In the case where carbon is added to the alloy and thereby the material is synthesized by the method using mechanical alloying method, the low crystalline structure or the amorphous structure is obtained and reaction time is reduced as well. The state of the raw material may be powder or a mass.

In addition to the SnCoC-containing material, a SnCoFeC-containing material having tin, cobalt, iron, and carbon as an element is also preferable. The composition of the SnCoFeC-containing material may be arbitrarily set. For example, as a composition in which the iron content is set small, it is preferable that the carbon content is in the range from 9.9 wt % to 29.7 wt %, both inclusive, the iron content is in the range from 0.3 wt % to 5.9 wt %, both inclusive, and the cobalt ratio to the total of tin and cobalt (Co/(Sn+Co)) is in the range from 30 wt % to 70 wt %, both inclusive. Further, for example, as a composition in which the iron content is set large, it is preferable that the carbon content is in the range from 11.9 wt % to 29.7 wt %, both inclusive, the ratio of the total of cobalt and iron to the total of tin, cobalt, and iron ((Co+Fe)/(Sn+Co+Fe)) is in the range from 26.4 wt % to 48.5 wt %, both inclusive, and the cobalt ratio to the total of cobalt and iron (Co/(Co+Fe)) is in the range from 9.9 wt % to 79.5 wt %, both inclusive. In such a composition range, a high energy density is obtained. The crystallinity of the SnCoFeC-containing material, the measurement method for examining bonding state of elements, the forming method of the SnCoFeC-containing material and the like are similar to those of the foregoing SnCoC-containing material.

As other material capable of inserting and extracting the electrode reactant, for example, a carbon material is included. As the carbon material, for example, graphitizable carbon, non-graphitizable carbon in which the spacing of (002) plane is 0.37 nm or more, graphite in which the spacing of (002) plane is 0.34 nm or less and the like are included. More specifically, pyrolytic carbon, coke, glassy carbon fiber, an organic polymer compound fired body, activated carbon, carbon black and the like are included. Of the foregoing, the coke includes pitch coke, needle coke, petroleum coke and the like. The organic polymer compound fired body is obtained by firing and carbonizing a phenol resin, a furan resin or the like at an appropriate temperature. In the carbon material, a change in the crystal structure associated with insertion and extraction of the electrode reactant is very small, and thus a high energy density is thereby obtained. In addition, the carbon material also functions as an electrical conductor, and thus the carbon material is preferably used. The shape of the carbon material may be any of a fibrous shape, a spherical shape, a granular shape, and a scale-like shape.

Further, as other material capable of inserting and extracting the electrode reactant, for example, a metal oxide, a polymer compound and the like capable of inserting and extracting the electrode reactant are included. The metal oxide is, for example, iron oxide, ruthenium oxide, molybdenum oxide or the like. The polymer compound is, for example, polyacetylene, polyaniline, polypyrrole or the like.

Two or more of the foregoing anode materials may be used by mixture arbitrarily. It is needless to say that other material capable of inserting and extracting the electrode reactant may be a material other than the foregoing materials.

The anode active material layer 2 is formed by, for example, vapor-phase deposition method, liquid-phase deposition method, spraying method, coating method, firing method, or two or more of these methods. In this case, it is preferable that at least part of the interface between the anode current collector 1 and the anode active material layer 2 is alloyed. Specifically, at the interface thereof, the element of the anode current collector 1 may be diffused in the anode active material layer 2, or the element of the anode active material layer 2 may be diffused in the anode current collector 1, or both elements may be diffused therein each other. Thereby, breakage due to expansion and shrinkage of the anode active material layer 2 is prevented in electrode reaction, and the electron conductivity between the anode current collector 1 and the anode active material layer 2 is improved.

As vapor-phase deposition method, for example, physical deposition method or chemical deposition method is included. Specifically, vacuum evaporation method, sputtering method, ion plating method, laser ablation method, thermal Chemical Vapor Deposition (CVD) method, plasma CVD method and the like are included. As liquid-phase deposition method, a known technique such as electrolytic plating and electroless plating is able to be used. Coating method is a method in which, for example, after a particulate anode active material is mixed with a binder and the like, the resultant mixture is dispersed in a solvent and then coating is provided. Firing method is, for example, a method in which after coating is provided by using coating method, heat treatment is provided at temperature higher than the melting point of the binder or the like. For firing method, a known technique such as atmosphere firing method, reactive firing method, and hot press firing method is included as well.

As the anode binder, for example, a synthetic rubber such as styrene-butadiene rubber, fluorinated rubber, and ethylene propylene diene; or a polymer material such as polyimide, polyamide, polyamideimide, and polyvinylidene fluoride are included. One thereof may be used singly, or a plurality thereof may be used by mixture.

Specially, at least one resin selected from the group consisting of polyimide, polyamide, and polyamideimide is preferable, since such a resin has superior heat resistance. In this case, at least part of the resin is preferably carbonized, since thereby a carbide functions as an electrical conductor. For carbonizing the resin, for example, in forming the anode active material layer 2 by firing method, heat treatment is provided at a temperature higher than the decomposition temperature of the resin. The heat treatment temperature is able to be arbitrarily set according to conditions such as the decomposition temperature of the resin and the carbonization degree. However, in the case where the heat treatment temperature is excessively high, the anode current collector 1 may be deformed and broken. Thus, the heat treatment temperature is preferably lower than the temperature at which the anode current collector 1 is deformed (for example, the melting point).

The anode active material layer 2 may contain other material such as an anode electrical conductor in addition to the anode active material and the anode binder.

As the anode electrical conductor, for example, a carbon material such as graphite, carbon black, acetylene black, and Ketjen black is included. Such a carbon material may be used singly, or a plurality thereof may be used by mixture. The anode electrical conductor may be a metal material, a conductive polymer or the like as long as the material has the electric conductivity.

The content of the anode binder, the anode electrical conductor and the like in the anode active material layer 2 may be set arbitrarily. As an example, the content of the anode binder is in the range from 20 wt % to 50 wt %, both inclusive. The content of the anode electrical conductor is in the range from 1 wt % to 10 wt %, both inclusive.

The anode is manufactured, for example, by the following procedure.

First, the anode current collector 1 made of an electrolytic copper foil or the like is prepared. Subsequently, an anode active material, an anode binder, an anode electrical conductor if necessary and the like are mixed to prepare an anode mixture, which is dispersed in a solvent to form anode mixture slurry. Subsequently, both faces of the anode current collector 1 are uniformly coated with the anode mixture slurry by a doctor blade, a bar coater or the like, which is dried. Subsequently, according to needs, the coating is compression-molded by a rolling press machine or the like. Finally, the coating is provided with heat treatment in the vacuum atmosphere to form the anode active material layer 2. It is preferable that the coating is heated at a temperature higher than the decomposition temperature of the anode binder, and part thereof is carbonized. Thereby, the anode is completed.

In forming the anode active material layer 2, for example, the peak position (pore diameter) described with reference to FIG. 2 and FIG. 3 is able to be adjusted by the following method. That is, in the case where coating method is used as a method of forming the anode active material layer 2, the peak position is able to be changed by adjusting the content of the anode binder in the anode active material layer 2 or adjusting the press pressure in forming the anode active material layer 2. Meanwhile, in the case where sintering method is used, the peak position is able to be changed by adjustment similar to that in the coating method or adjusting the heat treatment temperature.

According to the anode, the anode active material layer 2 containing the anode active material and the anode binder has the plurality of fine pores. The change rate of mercury intrusion into the plurality of fine pores measured by mercury penetration technique distributes to show a peak in the pore diameter range from 30 nm to 10000 nm, both inclusive. In this case, compared to a case that a peak is not shown in the foregoing pore diameter range, in electrode reaction, expansion and shrinkage of the anode active material layer 2 are prevented, and the internal stress associated therewith is relaxed. Thereby, in operating an electrochemical device, dropping of the anode active material layer 2 is prevented, increase of the thickness thereof is prevented, and accordingly the anode is able to contribute to improve the cycle characteristics and the swollenness characteristics. In this case, in the case where the change rate of mercury intrusion shows a peak in the pore diameter range from 100 nm to 5000 nm, both inclusive, higher effect is obtainable.

In particular, in the case where the change rate of mercury intrusion into the plurality of fine pores shows a plurality of peaks, if the maximum peak among the peaks exists in the pore diameter range from 100 nm to 5000 nm, both inclusive or if the porosity of the anode active material layer 2 is in the range from 4% to 70%, both inclusive, higher effect is obtainable.

Further, in the case where the anode active material is in a state of a plurality of particles, if the median size is in the range from 0.5 µm to 20 µm, both inclusive, higher effect is obtainable.

Further, in the case where the anode active material layer 2 contains silicon advantageous for achieving a high capacity as an anode active material (a material that is able to insert and extract the electrode reactant and that contains at least one of metal elements and metalloid elements), expansion and shrinkage of the anode active material layer 2 are prevented. Thus, compared to a case that other anode material such as a carbon material is contained, higher effect is obtainable.

Further, if the anode binder is at least one resin selected from the group consisting of polyimide, polyamide, and polyamideimide, higher effect is obtainable. In this case, if at least part of the resin is carbonized, further higher effect is obtainable.

Further, if the surface of the anode current collector 1 opposed to the anode active material layer 2 is roughened, the adhesion between the anode current collector 1 and the anode active material layer 2 is able to be improved. In this case, if the ten point height of roughness profile Rz of the surface of the anode current collector 1 is in the range from 0.5 µm to 6.5 µm, both inclusive, higher effect is obtainable.

Next, a description will be hereinafter given of a usage example of the foregoing anode. As an example of the electrochemical devices, secondary batteries are herein taken. The foregoing anode is used for the secondary batteries as follows.

First Secondary Battery

Figure 4:
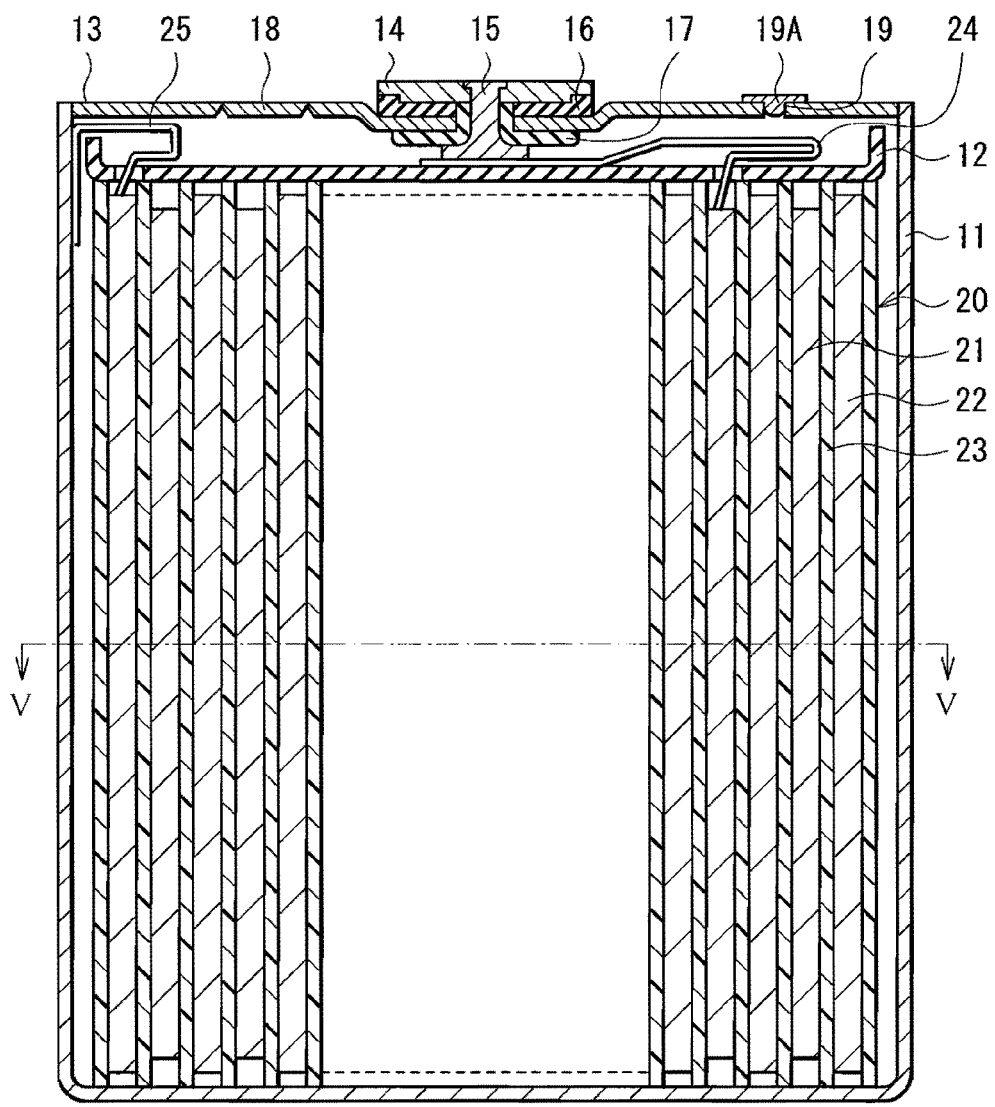
FIG. 4 is a cross sectional view illustrating a structure of a first secondary battery including the anode according to the embodiment of the invention.
Figure 5:
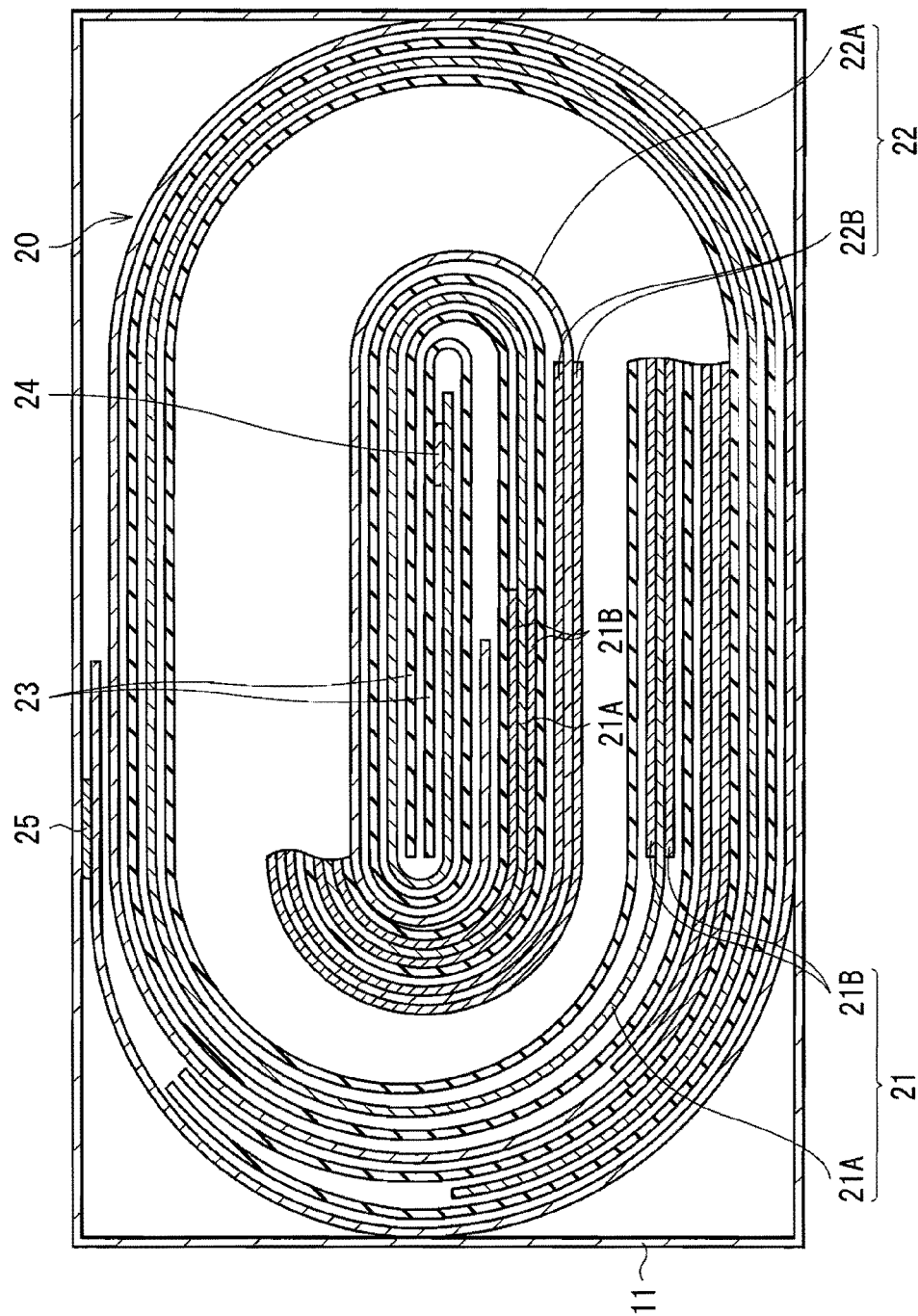
FIG. 5 is a cross sectional view taken along line V-V of the first secondary battery illustrated in FIG. 4.

FIG. 4 and FIG. 5 illustrate a cross sectional structure of a first secondary battery. FIG. 5 illustrates a cross section taken along line V-V illustrated in FIG. 4. The secondary battery herein described is, for example, a lithium ion secondary battery in which the capacity of an anode 22 is expressed based on insertion and extraction of lithium as an electrode reactant.

The secondary battery mainly contains a battery element 20 having a flat spirally wound structure in a battery can 11.

The battery can 11 is, for example, a square package member. As illustrated in FIG. 5, the square package member has a shape with the cross section in the longitudinal direction of a rectangle or an approximate rectangle (including curved lines in part). The battery can 11 forms not only a square battery in the shape of a rectangle, but also a square battery in the shape of an oval. That is, the square package member means a rectangle vessel-like member with the bottom or an oval vessel-like member with the bottom, which respectively has an opening in the shape of a rectangle or in the shape of an approximate rectangle (oval shape) formed by connecting circular arcs by straight lines. FIG. 5 illustrates a case that the battery can 11 has a rectangular cross sectional shape. The battery structure including the battery can 11 is a so-called square type.

The battery can 11 is made of, for example, a metal material such as iron, aluminum (Al), or an alloy thereof. The battery can 11 may have a function as an electrode terminal as well. In this case, to prevent the secondary battery from being swollen by using the rigidity (less deformable property) of the battery can 11 in charge and discharge, the battery can 11 is preferably made of iron that is more rigid than aluminum. In the case where the battery can 11 is made of iron, for example, the iron may be plated by nickel (Ni) or the like.

The battery can 11 also has a hollow structure in which one end of the battery can 11 is closed and the other end thereof is opened. At the open end of the battery can 11, an insulating plate 12 and a battery cover 13 are attached, and thereby inside of the battery can 11 is hermetically closed. The insulating plate 12 is located between the battery element 20 and the battery cover 13, is arranged perpendicularly to the spirally wound circumferential face of the battery element 20, and is made of, for example, polypropylene or the like. The battery cover 13 is, for example, made of a material similar to that of the battery can 11, and may also have a function as an electrode terminal as the battery can 11 does.

Outside of the battery cover 13, a terminal plate 14 as a cathode terminal is provided. The terminal plate 14 is electrically insulated from the battery cover 13 with an insulating case 16 in between. The insulating case 16 is made of, for example, polybutylene terephthalate or the like. In the approximate center of the battery cover 13, a through-hole is provided. A cathode pin 15 is inserted in the through-hole so that the cathode pin 15 is electrically connected to the terminal plate 14 and is electrically insulated from the battery cover 13 with a gasket 17 in between. The gasket 17 is made of, for example, an insulating material, and the surface thereof is coated with asphalt.

In the vicinity of the rim of the battery cover 13, a cleavage valve 18 and an injection hole 19 are provided. The cleavage valve 18 is electrically connected to the battery cover 13. In the case where the internal pressure of the battery becomes a certain level or more due to internal short circuit, external heating or the like, the cleavage valve 18 is separated from the battery cover 13 to release the internal pressure. The injection hole 19 is sealed by a sealing member 19A made of, for example, a stainless steel ball.

The battery element 20 is formed by layering a cathode 21 and the anode 22 with a separator 23 in between and then spirally winding the resultant laminated body. The battery element 20 is flat in accordance with the shape of the battery can 11. A cathode lead 24 made of a metal material such as aluminum is attached to an end of the cathode 21 (for example, the internal end thereof). An anode lead 25 made of a metal material such as nickel is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

In the cathode 21, for example, a cathode active material layer 21B is provided on both faces of a cathode current collector 21A having a pair of faces. However, the cathode active material layer 21B may be provided only on a single face of the cathode current collector 21A.

The cathode current collector 21A is made of, for example, a metal material such as aluminum, nickel, and stainless.

The cathode active material layer 21B contains, as a cathode active material, one or more cathode materials capable of inserting and extracting lithium. According to needs, the cathode active material layer 21B may contain other material such as a cathode binder and a cathode electrical conductor. The details of the cathode binder and the cathode electrical conductor are similar to those described for the anode binder and the anode electrical conductor.

As the cathode material capable of inserting and extracting lithium, for example, a lithium-containing compound is preferable, since thereby a high energy density is obtained. As the lithium-containing compound, for example, a complex oxide containing lithium and a transition metal element, a phosphate compound containing lithium and a transition metal element and the like are included. Specially, a compound containing at least one selected from the group consisting of cobalt, nickel, manganese, and iron as a transition metal element is preferable, since thereby a higher voltage is obtained. The chemical formula thereof is expressed by, for example, $Li_xMlO_2$ or $Li_yM2PO_4$. In the formula, M1 and M2 represent one or more transition metal elements. Values of x and y vary according to the charge and discharge state, and are generally in the range of $0.05 \leq x \leq 1.10$ and $0.05 \leq y \leq 1.10$.

As the complex oxide containing lithium and a transition metal element, for example, a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ (z<1)), a lithium nickel cobalt manganese complex oxide ($Li_xNi_{(1-v-w)}Co_vMn_wO_2$ (v+w<1)), lithium manganese complex oxide having a spinel structure ($LiMn_2O_4$) and the like are included. Specially, a complex oxide containing cobalt is preferable, since thereby a high capacity is obtained and superior cycle characteristics are obtained. Further, as the phosphate compound containing lithium and a transition metal element, for example, lithium iron phosphate compound ($LiFePO_4$) or a lithium iron manganese phosphate compound ($LiFe_{1-u}Mn_uPO_4$ (u<1)) and the like are included.

In addition, as the cathode material capable of inserting and extracting lithium, for example, an oxide such as titanium oxide, vanadium oxide, and manganese dioxide; a disulfide such as titanium disulfide and molybdenum sulfide; a chalcogenide such as niobium selenide; sulfur; a conductive polymer such as polyaniline and polythiophene are included.

It is needless to say that the cathode material capable of inserting and extracting lithium may be a material other than the foregoing compounds. Further, two or more of the foregoing cathode materials may be used by arbitrary mixture.

The anode 22 has a structure similar to that of the anode described above. For example, in the anode 22, an anode active material layer 22B is provided on both faces of an anode current collector 22A having a pair of faces. The structures of the anode current collector 22A and the anode active material layer 22B are respectively similar to the structures of the anode current collector 1 and the anode active material layer 2 in the foregoing anode. The chargeable capacity in the anode material capable of inserting and extracting lithium is preferably larger than the discharge capacity of the cathode 21.

The maximum utilization in the full charge state of the anode 22 (anode utilization) is not particularly limited. Specially, by adjusting the ratio between the capacity of the cathode 21 and the capacity of the anode 22, the maximum utilization is preferably in the range from 20% to 80%, both inclusive, or more preferably in the range from 30% to 70%, both inclusive, since thereby superior cycle characteristics and superior initial charge and discharge characteristics are obtained. More specifically, in the case where the anode utilization is smaller than 20%, the initial charge and discharge efficiency may be lowered. Meanwhile, in the case where the anode utilization is larger than 80%, expansion and shrinkage of the anode active material layer 22B are less prevented in charge and discharge, and thus the anode active material layer 22B may be dropped.

The foregoing "anode utilization" is expressed by anode utilization (%)=(X/Y)×100 where the lithium insertion amount per unit area in the full charge state of the anode 22 is X and the lithium amount capable of being electrochemically inserted into the anode 22 per unit area is Y. In the case where the anode material is a material having a metal element or a metalloid element capable of forming an alloy with lithium, the foregoing "insertion" means that the anode material is alloyed with lithium.

The insertion amount X is able to be obtained by, for example, the following procedure. First, after the secondary battery is charged to become in the full charge state, the secondary battery is disassembled, and the portion opposed to the cathode 21 in the anode 22 is cut out as an inspection anode. Subsequently, by using the inspection anode, an evaluation battery in which a metal lithium is a counter electrode is assembled. Finally, the evaluation battery is discharged and the discharge capacity in the initial discharge is examined. After that, the discharge capacity is divided by the area of the inspection anode to calculate the insertion amount X. "Discharge" in this case means that applying a current in the direction in which lithium ions are extracted from the inspection anode.

Meanwhile, the insertion amount Y is obtained by, for example, as follows. The foregoing evaluation battery that has been already discharged is charged under a constant current and a constant voltage until the battery voltage becomes 0V to examine the charge capacity. After that, the charge capacity is divided by the area of the inspection anode. "Charge" in this case means that applying a current in the direction in which lithium ions are inserted into the inspection anode.

As charge and discharge conditions in obtaining the foregoing insertion amounts X and Y, for example, discharge is performed until the battery voltage reaches 1.5 V while the current density is set to 1 mA/cm$^2$, and constant voltage charge is performed until the current value becomes 0.05 mA or less while the battery voltage is set to 0 V.

The separator 23 separates the cathode 21 from the anode 22, and passes ions as an electrode reactant while preventing current short circuit due to contact of both electrodes. The separator 23 is made of, for example, a porous film composed of a synthetic resin such as polytetrafluoroethylene, polypropylene, and polyethylene, or a ceramic porous film. The separator 23 may have a structure in which two or more foregoing porous films are layered.

An electrolytic solution as a liquid electrolyte is impregnated in the separator 23. The electrolytic solution contains a solvent and an electrolyte salt dissolved therein.

The solvent contains, for example, one or more nonaqueous solvents such as an organic solvent. The solvents described below may be arbitrarily combined.

As the nonaqueous solvent, for example, ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide and the like are included. Thereby, a superior battery capacity, superior cycle characteristics, and superior storage characteristics are obtained. Specially, at least one selected from the group consisting of ethylene carbonate, propylene carbonate, dimethyl carbonate, diethyl carbonate, and ethyl methyl carbonate is preferable. In this case, a mixture of a high viscosity (high dielectric constant) solvent (for example, specific inductive ∈≥30) such as ethylene carbonate and propylene carbonate and a low viscosity solvent (for example, viscosity≤1 mPa·s) such as dimethyl carbonate, ethylmethyl carbonate, and diethyl carbonate is more preferable. Thereby, dissociation property of the electrolyte salt and ion mobility are improved.

In particular, the solvent preferably contains at least one of a chain ester carbonate having halogen as an element represented by Chemical formula 1 and a cyclic ester carbonate having halogen as an element represented by Chemical formula 2. Thereby, a stable protective film is formed on the surface of the anode 22 in charge and discharge, and decomposition reaction of the electrolytic solution is prevented.

Chemical formula 1

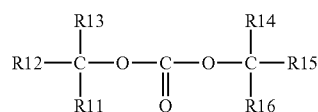

In the formula, R11 to R16 are a hydrogen group, a halogen group, an alkyl group, or an alkyl halide group. At least one of R11 to R16 is the halogen group or the alkyl halide group.

Chemical formula 2

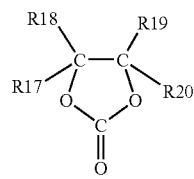

In the formula, R17 to R20 are a hydrogen group, a halogen group, an alkyl group, or an alkyl halide group. At least one of R17 to R20 is the halogen group or the alkyl halide group.

R11 to R16 in Chemical formula 1 may be identical or different. That is, types of R11 to R16 may be individually set in the range of the foregoing groups. The same is applied to R17 to R20 in Chemical formula 2.

The halogen type is not particularly limited, but fluorine, chlorine, or bromine is preferable, and fluorine is more preferable since thereby higher effect is obtained. compared to other halogen.

The number of halogen is more preferably two than one, and further may be three or more, since thereby an ability to form a protective film is improved, and a more rigid and stable protective film is formed. Accordingly, decomposition reaction of the electrolytic solution is further prevented.

As the chain ester carbonate having halogen represented by Chemical formula 1, for example, fluoromethyl methyl carbonate, bis(fluoromethyl)carbonate, difluoromethyl methyl carbonate and the like are included. One thereof may be used singly, or a plurality thereof may be used by mixture. Specially, bis(fluoromethyl)carbonate is preferable, since thereby high effect is obtained.

As the cyclic ester carbonate having halogen represented by Chemical formula 2, for example, the compounds represented by Chemical formulas 3(1) to 4(9) are included. That is, 4-fluoro-1,3-dioxolane-2-one of Chemical formula 3(1), 4-chloro-1,3-dioxolane-2-one of Chemical formula 3(2), 4,5-difluoro-1,3-dioxolane-2-one of Chemical formula 3(3), tetrafluoro-1,3-dioxolane-2-one of Chemical formula 3(4), 4-chloro-5-fluoro-1,3-dioxolane-2-one of Chemical formula 3(5), 4,5-dichloro-1,3-dioxolane-2-one of Chemical formula 3(6), tetrachloro-1,3-dioxolane-2-one of Chemical formula 3(7), 4,5-bistrifluoromethyl-1,3-dioxolane-2-one of Chemical formula 3(8), 4-trifluoromethyl-1,3-dioxolane-2-one of Chemical formula 3(9), 4,5-difluoro-4,5-dimethyl-1,3-dioxolane-2-one of Chemical formula 3(10), 4,4-difluoro-5-methyl-1,3-dioxolane-2-one of Chemical formula 3(11), 4-ethyl-5,5-difluoro-1,3-dioxolane-2-one of Chemical formula 3(12) and the like are included. Further, 4-fluoro-5-trifluoromethyl-1,3-dioxolane-2-one of Chemical formula 4(1), 4-methyl-5-trifluoromethyl-1,3-dioxolane-2-one of Chemical formula 4(2), 4-fluoro-4,5-dimethyl-1,3-dioxolane-2-one of Chemical formula 4(3), 5-(1,1-difluoroethyl)-4,4-difluoro-1,3-dioxolane-2-one of Chemical formula 4(4), 4,5-dichloro-4,5-dimethyl-1,3-dioxolane-2-one of Chemical formula 4(5), 4-ethyl-5-fluoro-1,3-dioxolane-2-one of Chemical formula 4(6), 4-ethyl-4,5-difluoro-1,3-dioxolane-2-one of Chemical formula 4(7), 4-ethyl-4,5,5-trifluoro-1,3-dioxolane-2-one of Chemical formula 4(8), 4-fluoro-4-methyl-1,3-dioxolane-2-one of Chemical formula 4(9) and the like are included. One thereof may be used singly, or a plurality thereof may be used by mixture.

Chemical formula 3

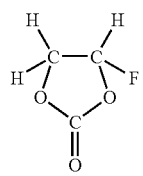

(1)

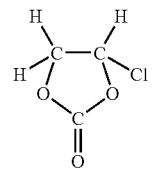

(2)

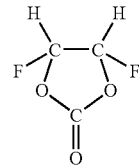

(3)

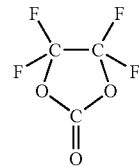

(4)

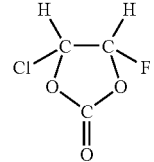

(5)

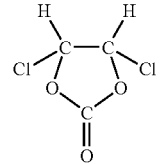

(6)

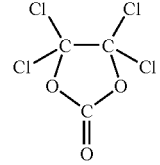

(7)

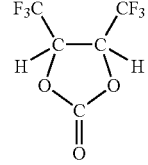

(8)

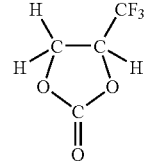

(9)

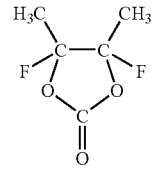

(10)

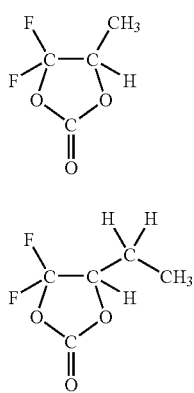

Chemical formula 4

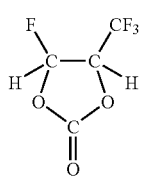
(1)

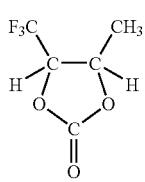
(2)

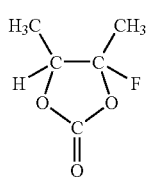
(3)

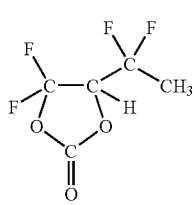
(4)

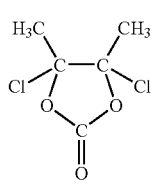
(5)

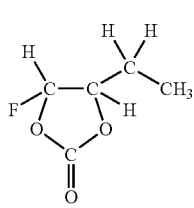
(6)

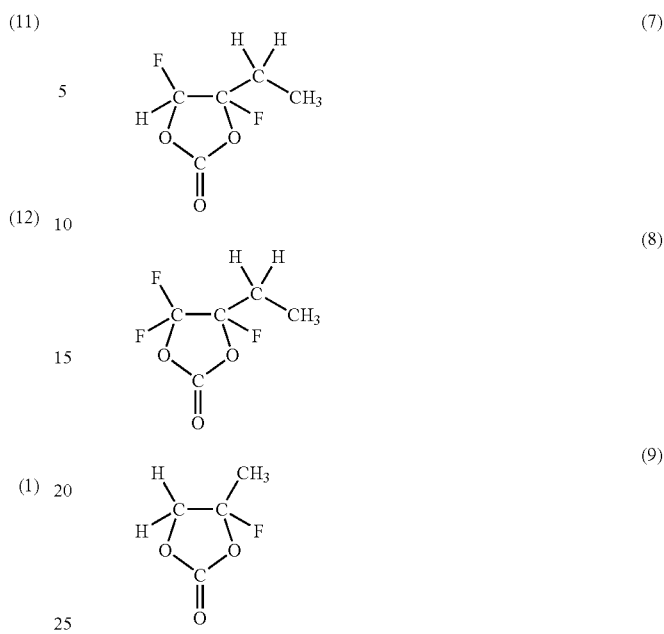

Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is more preferable than a sis isomer, since the trans isomer is easily available and provides high effect.

The solvent preferably contains a cyclic ester carbonate having an unsaturated bond represented by Chemical formula 5 to Chemical formula 7. Thereby, the chemical stability of the electrolytic solution is further improved. One thereof may be used singly, or a plurality thereof may be used by mixture.

Chemical formula 5

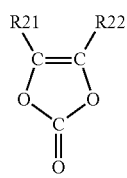

In the formula, R21 and R22 are a hydrogen group or an alkyl group.

Chemical formula 6

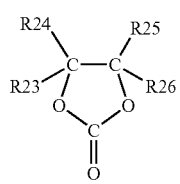

In the formula, R23 to R26 are a hydrogen group, an alkyl group, a vinyl group, or an aryl group. At least one of R23 to R26 is the vinyl group or the aryl group.

Chemical formula 7

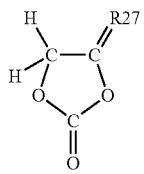

In the formula, R27 is an alkylene group.

The cyclic ester carbonate having an unsaturated bond represented by Chemical formula 5 is a vinylene carbonate compound. As the vinylene carbonate compound, for example, vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, 4-trifluoromethyl-1,3-dioxole-2-one and the like are included. Specially, vinylene carbonate is preferable, since vinylene carbonate is easily available and provides high effect.

The cyclic ester carbonate having an unsaturated bond represented by Chemical formula 6 is a vinylethylene carbonate compound. As the vinylethylene carbonate compound, for example, vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one and the like are included. Specially, vinylethylene carbonate is preferable, since vinylethylene carbonate is easily available, and provides high effect. It is needless to say that all of R23 to R26 may be the vinyl group or the aryl group. Otherwise, it is possible that some of R23 to R26 are the vinyl group, and the others thereof are the aryl group.

The cyclic ester carbonate having an unsaturated bond represented by Chemical formula 7 is a methylene ethylene carbonate compound. As the methylene ethylene carbonate compound, 4-methylene-1,3-dioxolane-2-one, 4,4-dimethyl-5-methylene-1,3-dioxolane-2-one, 4,4-diethyl-5-methylene-1,3-dioxolane-2-one and the like are included. The methylene ethylene carbonate compound may have one methylene group (compound represented by Chemical formula 7), or have two methylene groups.

The cyclic ester carbonate having an unsaturated bond may be catechol carbonate having a benzene ring or the like, in addition to the compounds represented by Chemical formula 5 to Chemical formula 7.

Further, the solvent preferably contains sultone (cyclic sulfonic ester) and an acid anhydride, since thereby chemical stability of the electrolytic solution is further improved.

As the sultone, for example, propane sultone, propene sultone or the like is included. Specially, propene sultone is preferable. Such sultone may be used singly, or a plurality thereof may be used by mixture. The sultone content in the solvent is, for example, in the range from 0.5 wt % to 5 wt %, both inclusive.

As the acid anhydride, for example, carboxylic anhydride such as succinic anhydride, glutaric anhydride, and maleic anhydride; disulfonic anhydride such as ethane disulfonic anhydride and propane disulfonic anhydride; an anhydride of carboxylic acid and sulfonic acid such as sulfobenzoic anhydride, sulfopropionic anhydride, and sulfobutyric anhydride and the like are included. Specially, succinic anhydride or sulfobenzoic anhydride is preferable. The anhydrides may be used singly, or a plurality thereof may be used by mixture. The content of the acid anhydride in the solvent is, for example, in the range from 0.5 wt % to 3 wt %, both inclusive.

The electrolyte salt contains, for example, one or more light metal salts such as a lithium salt. The electrolyte salts described below may be combined arbitrarily.

As the lithium salt, for example, lithium hexafluorophosphate, lithium tetrafluoroborate, lithium perchlorate, lithium hexafluoroarsenate, lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr) and the like are included, since thereby a superior battery capacity, superior cycle characteristics, and superior storage characteristics are obtained.

Specially, at least one selected from the group consisting of lithium hexafluorophosphate, lithium tetrafluoroborate, lithium perchlorate, and lithium hexafluoroarsenate is preferable, and lithium hexafluorophosphate is more preferable, since the internal resistance is lowered, and thus higher effect is obtained.

In particular, the electrolyte salt preferably contains at least one selected from the group consisting of the compounds represented by Chemical formula 8 to Chemical formula 10. Thereby, in the case where such a compound is used together with the foregoing lithium hexafluorophosphate or the like, higher effect is obtained. R31 and R33 in Chemical formula 8 may be identical or different. The same is applied to R41 to R43 in Chemical formula 9 and R51 and R52 in Chemical formula 10.

Chemical formula 8

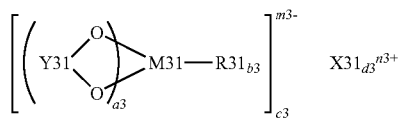

In the formula, X31 is a Group 1 element or a Group 2 element in the long period periodic table or aluminum. M31 is a transition metal element, a Group 13 element, a Group 14 element, or a Group 15 element in the long period periodic table. R31 is a halogen group. Y31 is —(O=)C—R32-C(=O)—, —(O=)C—C(R33)$_2$-, or —(O=)C—C(=O)—. R32 is an alkylene group, an alkylene halide group, an arylene group, or an arylene halide group. R33 is an alkyl group, an alkyl halide group, an aryl group, or an aryl halide group. a3 is one of integer numbers 1 to 4. b3 is 0, 2, or 4. c3, d3, m3, and n3 are one of integer numbers 1 to 3.

Chemical formula 9

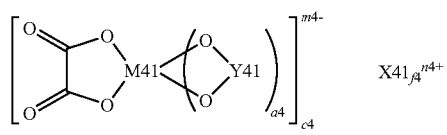

In the formula, X41 is a Group 1 element or a Group 2 element in the long period periodic table. M41 is a transition metal element, a Group 13 element, a Group element, or a Group 15 element in the long period periodic table. Y41 is —(O=)C—(C(R41)$_2$)$_{b4}$-C(=O)—, —(R43)$_2$C—(C(R42)$_2$)$_{c4}$-C(=O)—, —(R43)$_2$C—(C(R42)$_2$)$_{c4}$-C(R43)$_2$-, —(R43)$_2$C—(C(R42)$_2$)$_{c4}$-S(=O)$_2$—, —(O=)$_2$S—(C(R42)$_2$)$_{d4}$-S(=O)$_2$—, or —(O=)C—(C(R42)$_2$)$_{d4}$-S(=O)$_2$—. R41 and R43 are a hydrogen group, an alkyl group, a halogen group, or an alkyl halide group. At least one of R41 and R43 is respectively the halogen group or the alkyl halide group. R42 is a hydrogen group, an alkyl group, a halogen group, or an alkyl halide group. a4, e4, and n4 are an integer number of 1 or 2. b4 and d4 are one of integer numbers 1 to 4. c4 is one of integer numbers 0 to 4. f4 and m4 are one of integer numbers 1 to 3.

Chemical formula 10

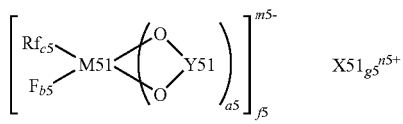

In the formula, X51 is a Group 1 element or a Group 2 element in the long period periodic table. M51 is a transition metal element, a Group 13 element, a Group element, or a Group 15 element in the long period periodic table. Rf is a fluorinated alkyl group with the carbon number in the range from 1 to 10, both inclusive or a fluorinated aryl group with the carbon number in the range from 1 to 10, both inclusive. Y51 is —(O=)C—(C(R51)$_2$)$_{d5}$-C(=O)—, —(R52)$_2$C—(C(R51)$_2$)$_{d5}$-C(=O)—, —(R52)$_2$C—(C(R51)$_2$)$_{d5}$-C(R52)$_2$-, —(R52)$_2$C—(C(R51)$_2$)$_{d5}$-S(=O)$_2$—, —(O=)$_2$S—(C(R51)$_2$)$_{e5}$-S(=O)$_2$—, or —(O=)C—(C(R51)$_2$)$_{e5}$-S(=O)$_2$—. R51 is a hydrogen group, an alkyl group, a halogen group, or an alkyl halide group. R52 is a hydrogen group, an alkyl group, a halogen group, or an alkyl halide group, and at least one thereof is the halogen group or the alkyl halide group. a5, f5, and n5 are 1 or 2. b5, c5, and e5 are one of integer numbers 1 to 4. d5 is one of integer numbers 0 to 4. g5 and m5 are one of integer numbers 1 to 3.

The long period periodic table is shown in "Inorganic chemistry nomenclature (revised edition)" proposed by IUPAC (International Union of Pure and Applied Chemistry). Specifically, Group 1 element represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

As a compound represented by Chemical formula 8, for example, the compounds represented by Chemical formulas 11(1) to 11(6) and the like are included. As a compound represented by Chemical formula 9, for example, the compounds represented by Chemical formulas 12(1) to 12(8) and the like are included. As a compound represented by Chemical formula 10, for example, the compound represented by Chemical formula 13 and the like are included. It is needless to say that the compound is not limited to the compounds represented by Chemical formula 11(1) to Chemical formula 13, and the compound may be other compound as long as such a compound has the structure represented by Chemical formula 8 to Chemical formula 10.

Chemical formula 11

 (1)

 (2)

 (3)

 (4)

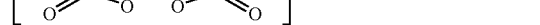 (5)

 (6)

Chemical formula 12

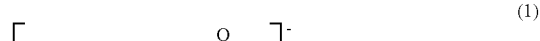 (1)

 (2)

 (3)

 (4)

 (5)

-continued (6)
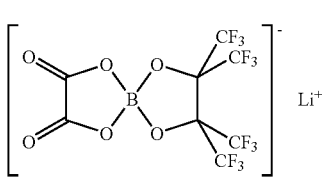

(7)
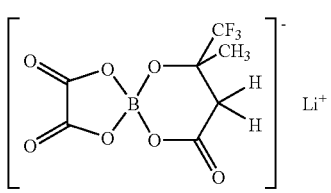

(8)
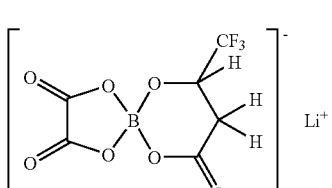

Chemical formula 13

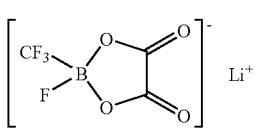

Further, the electrolyte salt may contain at least one selected from the group consisting of the compounds represented by Chemical formula 14 to Chemical formula 16. Thereby, in the case where such a compound is used together with the foregoing lithium hexafluorophosphate or the like, higher effect is obtained. m and n in Chemical formula 14 may be identical or different. The same is applied to p, q, and r in Chemical formula 16.

$$LiN(C_mF_{2m+1}SO_2)(C_nF_{2n+1}SO_2) \quad \text{Chemical formula 14}$$

In the formula, m and n are an integer number of 1 or more.

Chemical formula 15

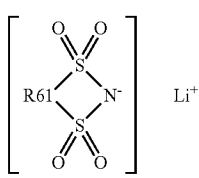

In the formula, R61 is a straight chain or branched perfluoro alkylene group with the carbon number in the range from 2 to 4, both inclusive.

$$LiC(C_pF_{2p+1}SO_2)(C_qF_{2q+1}SO_2)(C_rF_{2r+1}SO_2) \quad \text{Chemical formula 16}$$

In the formula, p, q, and r are an integer number of 1 or more.

As the chain compound represented by Chemical formula 14, for example, lithium bis(trifluoromethanesulfonyl)imide ($LiN(CF_3SO_2)_2$), lithium bis(pentafluoroethanesulfonyl) imide ($LiN(C_2F_5SO_2)_2$), lithium (trifluoromethanesulfonyl) (pentafluoroethanesulfonyl)imide ($LiN(CF_3SO_2)(C_2F_5SO_2)$), lithium (trifluoromethanesulfonyl) (heptafluoropropanesulfonyl)imide ($LiN(CF_3SO_2)(C_3F_7SO_2)$), lithium (trifluoromethanesulfonyl) (nonafluorobutanesulfonyl)imide ($LiN(CF_3SO_2)(C_4F_9SO_2)$) and the like are included. One thereof may be used singly, or a plurality thereof may be used by mixture.

As the cyclic compound represented by Chemical formula 15, for example, the compounds represented by Chemical formulas 17(1) to 17(4) are included. That is, lithium 1,2-perfluoroethanedisulfonylimide represented by Chemical formula 17(1), lithium 1,3-perfluoropropanedisulfonylimide represented by Chemical formula 17(2), lithium 1,3-perfluorobutanedisulfonylimide represented by Chemical formula 17(3), lithium 1,4-perfluorobutanedisulfonylimide represented by Chemical formula 17(4) and the like are included. One thereof may be used singly, or a plurality thereof may be used by mixture. Specially, lithium 1,2-perfluoroethanedisulfonylimide is preferable, since thereby high effect is obtained.

Chemical formula 17

(1)
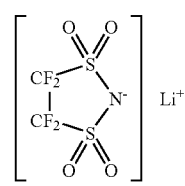

(2)
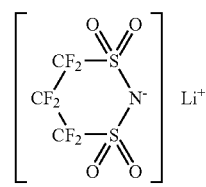

(3)
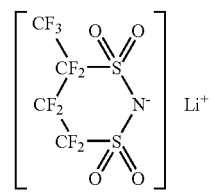

(4)
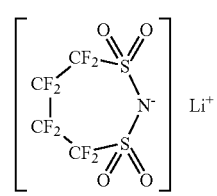

As the chain compound represented by Chemical formula 16, for example, lithium tris(trifluoromethanesulfonyl)methyde ($LiC(CF_3SO_2)_3$) and the like are included.

The content of the electrolyte salt to the solvent is preferably in the range from 0.3 mol/kg to 3.0 mol/kg, both inclusive. If the content is out of the foregoing range, there is a possibility that the ion conductivity is extremely lowered.

The secondary battery is manufactured, for example, by the following procedure.

First, the cathode 21 is formed. First, a cathode active material, a cathode binder, and a cathode electrical conductor are mixed to prepare a cathode mixture, which is dispersed in an organic solvent to form paste cathode mixture slurry. Subsequently, both faces of the cathode current collector 21A are uniformly coated with the cathode mixture slurry by using a doctor blade, a bar coater or the like, which is dried. Finally, the coating is compression-molded by using a rolling press machine or the like while being heated if necessary to form the cathode active material layer 21B. In this case, the resultant may be compression-molded over several times.

Next, the anode 22 is formed by forming the anode active material layer 22B on both faces of the anode current collector 22A by the same procedure as that of forming the anode described above.

Next, the battery element 20 is formed by using the cathode 21 and the anode 22. First, the cathode lead 24 is attached to the cathode current collector 21A by welding or the like, and the anode lead 25 is attached to the anode current collector 22A by welding or the like. Subsequently, the cathode 21 and the anode 22 are layered with the separator 23 in between, and then are spirally wound in the longitudinal direction. Finally, the spirally wound body is formed into a flat shape.

The secondary battery is assembled as follows. First, after the battery element 20 is contained in the battery can 11, the insulating plate 12 is arranged on the battery element 20. Subsequently, the cathode lead 24 is connected to the cathode pin 15 by welding or the like, and the anode lead 25 is connected to the battery can 11 by welding or the like. After that, the battery cover 13 is fixed on the open end of the battery can 11 by laser welding or the like. Finally, the electrolytic solution is injected into the battery can 11 from the injection hole 19, and impregnated in the separator 23. After that, the injection hole 19 is sealed by the sealing member 19A. The secondary battery illustrated in FIG. 4 and FIG. 5 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the square secondary battery, since the anode 22 has the structure similar to that of the foregoing anode, in charge and discharge, dropping of the anode active material layer 22B is prevented, and an increase in the thickness of the anode active material layer 22B is prevented. In this case, impregnation characteristics of the electrolytic solution in the anode 22 is improved. Therefore, the cycle characteristics and the swollenness characteristics are able to be improved.

In particular, in the case where the anode utilization is in the range from 20% to 80%, both inclusive, superior cycle characteristics, superior swollenness characteristics, and superior initial charge and discharge characteristics are able to be obtained.

Further, in the case where the solvent of the electrolytic solution contains at least one of the chain ester carbonate having halogen represented by Chemical formula 1 and the cyclic ester carbonate having halogen represented by Chemical formula 2; at least one of the cyclic ester carbonate having an unsaturated bond represented by Chemical formula 5 to Chemical formula 7; sultone; or an acid anhydride, higher effect is obtainable.

Further, in the case where the electrolyte salt of the electrolytic solution contains at least one selected from the group consisting of lithium hexafluorophosphate, lithium tetrafluoroborate, lithium perchlorate, and lithium hexafluoroarsenate; at least one selected from the group consisting of the compounds represented by Chemical formula 8 to Chemical formula 10; or at least one selected from the group consisting of the compounds represented by Chemical formula 14 to Chemical formula 16, higher effect is obtainable.

Further, in the case where the battery can 11 is made of a rigid metal, compared to a case that the battery can 11 is made of a soft film, the anode 22 is less likely to break in the case where the anode active material layer 22B is swollen or shrunk. Accordingly, the cycle characteristics are able to be further improved. In this case, in the case where the battery can 11 is made of iron that is more rigid than aluminum, higher effect is obtainable.

Effects of the secondary battery other than the foregoing effects are similar to those of the foregoing anode.

Second Secondary Battery

Figure 6:
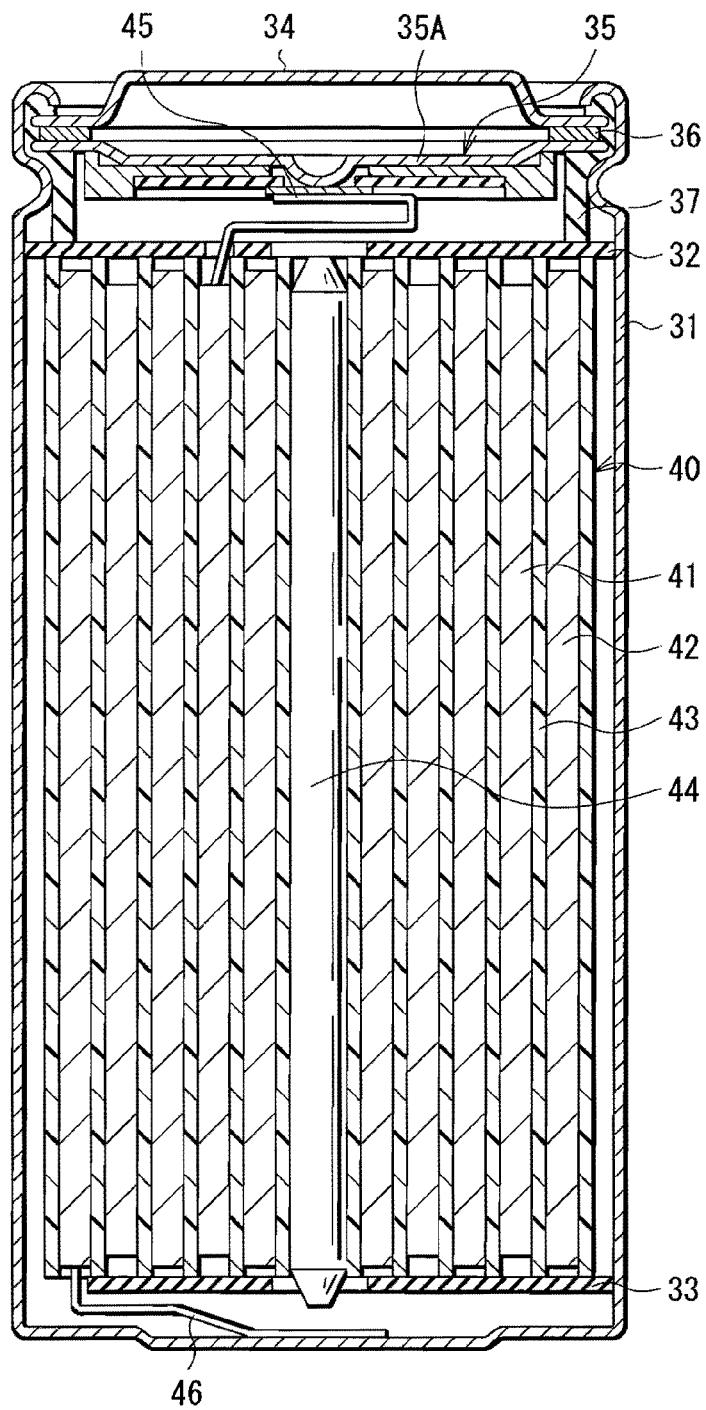
FIG. 6 is a cross sectional view illustrating a structure of a second secondary battery including the anode according to the embodiment of the invention.
Figure 7:
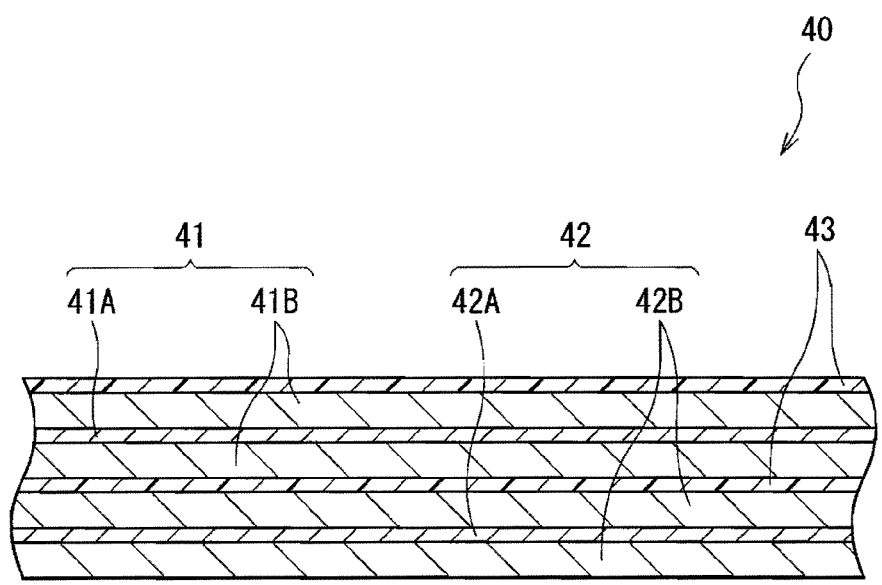
FIG. 7 is a cross sectional view illustrating an enlarged part of the spirally wound electrode body illustrated in FIG. 6.

FIG. 6 and FIG. 7 illustrate a cross sectional structure of a second secondary battery. FIG. 7 illustrates an enlarged part of a spirally wound electrode body 40 illustrated in FIG. 6.

The second secondary battery is, for example, a lithium ion secondary battery as the foregoing first secondary battery. The secondary battery contains the spirally wound electrode body 40 in which a cathode 41 and an anode 42 are layered with a separator 43 in between and spirally wound, and a pair of insulating plates 32 and 33 inside a battery can 31 in the shape of an approximately hollow cylinder. The battery structure including the battery can 31 is a so-called cylindrical type.

The battery can 31 is made of, for example, a metal material similar to that of the battery can 11 in the foregoing first secondary battery. One end of the battery can 31 is closed, and the other end thereof is opened. The pair of insulating plates 32 and 33 is arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. Inside of the battery can 31 is thereby hermetically sealed. The battery cover 34 is made of, for example, a metal material similar to that of the battery can 31. The safety valve mechanism 35 is electrically connected to the battery cover 34 through the PTC device 36. In the safety valve mechanism 35, in the case where the internal pressure becomes a certain level or more by internal short circuit, external heating or the like, a disk plate 35A flips to cut the electric connection between the battery cover 34 and the spirally wound electrode body 40. As temperature rises, the PTC device 36 increases the resistance and thereby limits a current to prevent abnormal heat generation resulting from a large current. The gasket 37 is made of, for example, an insulating material and its surface is coated with asphalt.

A center pin 44 may be inserted in the center of the spirally wound electrode body 40. In the spirally wound electrode body 40, a cathode lead 45 made of a metal material such as aluminum is connected to the cathode 41, and an anode lead 46 made of a metal material such as nickel is connected to the anode 42. The cathode lead 45 is electrically connected to the battery cover 34 by being welded to the safety valve mechanism 35. The anode lead 46 is welded and thereby electrically connected to the battery can 31.

The cathode 41 has a structure in which, for example, a cathode active material layer 41B is provided on both faces of a cathode current collector 41A having a pair of faces. The anode 42 has a structure similar to that of the foregoing anode, for example, a structure in which an anode active material layer 42B is provided on both faces of an anode current collector 42A having a pair of faces. The structures of the cathode current collector 41A, the cathode active material layer 41B, the anode current collector 42A, the anode active material layer 42B, and the separator 43 and the composition of the electrolytic solution are respectively similar to the structures of the cathode current collector 21A, the cathode active material layer 21B, the anode current collector 22A, the anode active material layer 22B, and the separator 23, and the composition of the electrolytic solution in the foregoing first secondary battery.

The secondary battery is manufactured, for example, by the following procedure.

First, for example, the cathode 41 is formed by forming the cathode active material layer 41B on both faces of the cathode current collector 41A and the anode 42 is formed by forming the anode active material layer 42B on both faces of the anode current collector 42A with the use of procedures similar to the procedures of forming the cathode 21 and the anode 22 in the foregoing first secondary battery. Subsequently, the cathode lead 45 is attached to the cathode 41 by welding or the like, and the anode lead 46 is attached to the anode 42 by welding or the like. Subsequently, the cathode 41 and the anode 42 are layered with the separator 34 in between and spirally wound, and thereby the spirally wound electrode body 40 is formed. After that, the center pin 44 is inserted in the center of spirally wound electrode body 40. Subsequently, the spirally wound electrode body 40 is sandwiched between the pair of insulating plates 32 and 33, and contained in the battery can 31. The end of the cathode lead 45 is welded to the safety valve mechanism 35, and the end of the anode lead 46 is welded to the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery illustrated in FIG. 6 and FIG. 7 is thereby completed.

In the secondary battery, when charged, for example, lithium ions are extracted from the cathode 41 and inserted in the anode 42 through the electrolytic solution. Meanwhile, when discharged, for example, lithium ions are extracted from the anode 42, and inserted in the cathode 41 through the electrolytic solution.

According to the cylindrical secondary battery, the anode 42 has the structure similar to that of the foregoing anode. Thus, the cycle characteristics and the swollenness characteristics are able to be improved. Effects of the secondary battery other than the foregoing effects are similar to those of the first secondary battery.

Third Secondary Battery

Figure 8:
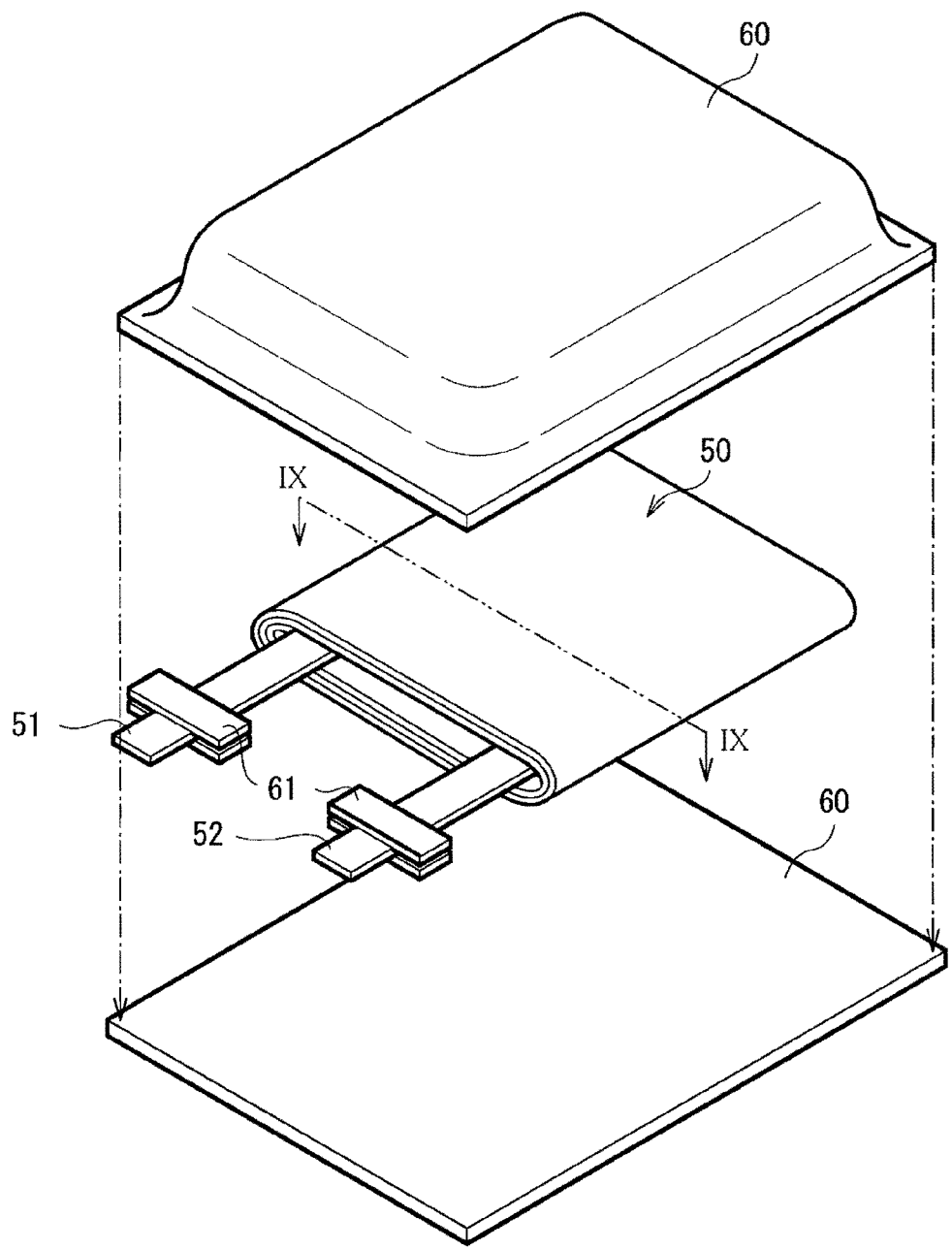
FIG. 8 is a cross sectional view illustrating a structure of a third secondary battery including the anode according to the embodiment of the invention.
Figure 9:
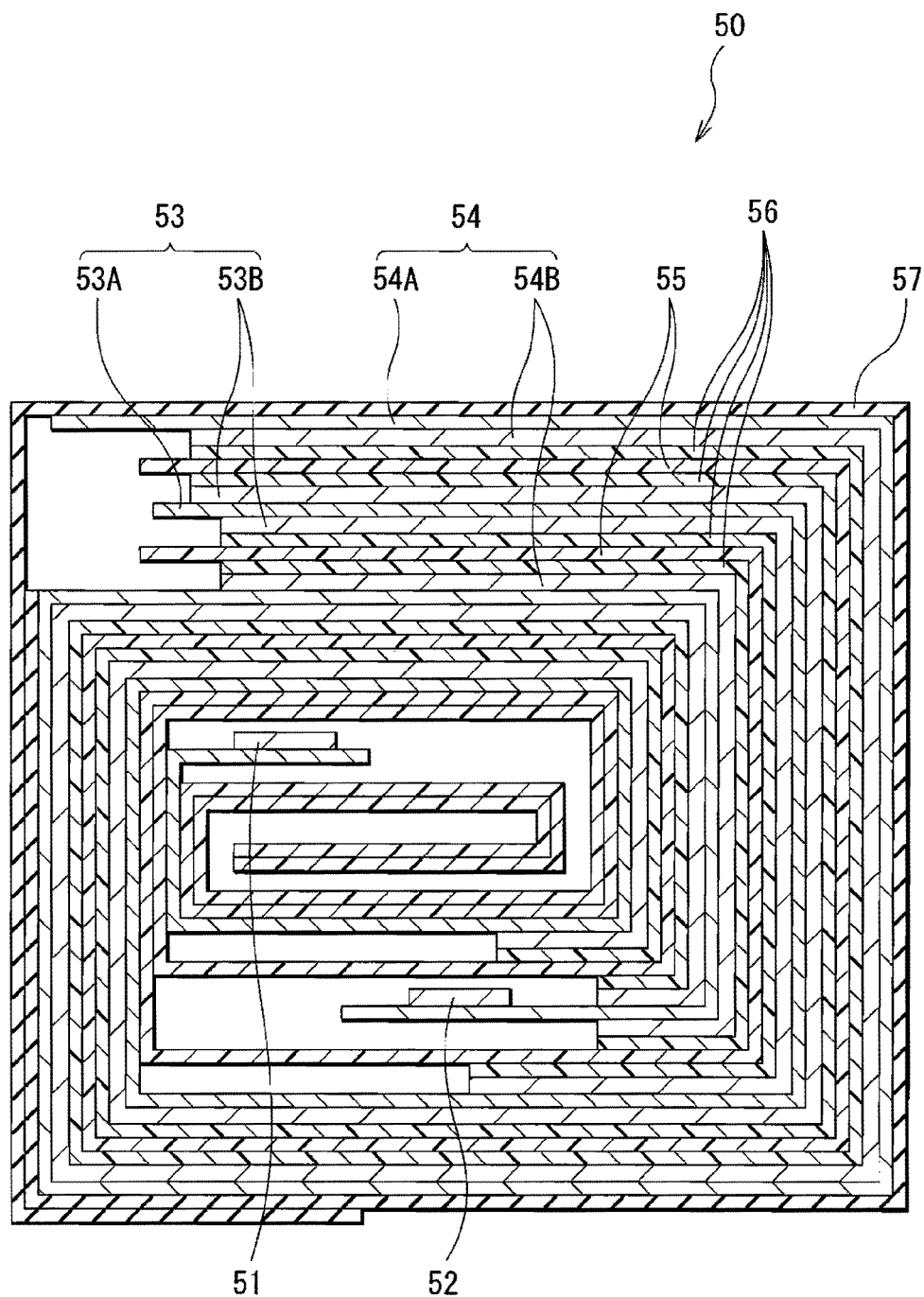
FIG. 9 is a cross sectional view taken along line IX-IX of the spirally wound electrode body illustrated in FIG. 8.

FIG. 8 illustrates an exploded perspective structure of a third secondary battery. FIG. 9 illustrates an exploded cross section taken along line IX-IX illustrated in FIG. 8.

The third secondary battery is, for example, a lithium ion secondary battery as the foregoing first secondary battery. In the secondary battery, a spirally wound electrode body 50 on which a cathode lead 51 and an anode lead 52 are attached is contained in a film package member 60. The battery structure including the package member 60 is so-called laminated film type.

The cathode lead 51 and the anode lead 52 are respectively directed from inside to outside of the package member 60 in the same direction, for example. The cathode lead 51 is made of, for example, a metal material such as aluminum, and the anode lead 52 is made of, for example, a metal material such as copper, nickel, and stainless. These metal materials are in the shape of a thin plate or mesh.

The package member 60 is made of an aluminum laminated film in which, for example, a nylon film, an aluminum foil, and a polyethylene film are bonded together in this order. The package member 60 has, for example, a structure in which the respective outer edges of 2 pieces of rectangle aluminum laminated films are bonded to each other by fusion bonding or an adhesive so that the polyethylene film and the spirally wound electrode body 50 are opposed to each other.

An adhesive film 61 to protect from the entering of outside air is inserted between the package member 60 and the cathode lead 51, the anode lead 52. The adhesive film 61 is made of a material having adhesion to the cathode lead 51 and the anode lead 52. Examples of such a material include, for example, a polyolefin resin such as polyethylene, polypropylene, modified polyethylene, and modified polypropylene.

The package member 60 may be made of a laminated film having other lamination structure, a polymer film such as polypropylene, or a metal film, instead of the foregoing aluminum laminated film.

In the spirally wound electrode body 50, a cathode 53 and an anode 54 are layered with a separator 55 and an electrolyte 56 in between and spirally wound. The outermost periphery thereof is protected by a protective tape 57.

The cathode 53 has a structure in which, for example, a cathode active material layer 53B is provided on both faces of a cathode current collector 53A having a pair of faces. The anode 54 has a structure similar to that of the foregoing anode, for example, has a structure in which an anode active material layer 54B is provided on both faces of an anode current collector 54A having a pair of faces. The structures of the cathode current collector 53A, the cathode active material layer 53B, the anode current collector 54A, the anode active material layer 54B, and the separator 55 are respectively similar to those of the cathode current collector 21A, the cathode active material layer 21B, the anode current collector 22A, the anode active material layer 22B, and the separator 23 of the foregoing first secondary battery.

The electrolyte 56 is a so-called gel electrolyte, containing an electrolytic solution and a polymer compound that holds the electrolytic solution. The gel electrolyte is preferable, since high ion conductivity (for example, 1 mS/cm or more at room temperature) is obtained and liquid leakage is prevented.

As the polymer compound, for example, polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate or the like is included. One of these polymer compounds may be used singly, or two or more thereof may be used by mixture. Specially, polyacrylonitrile, polyvinylidene fluoride, polyhexafluoropropylene, polyethylene oxide or the like is preferably used, since such a compound is electrochemically stable.

The composition of the electrolytic solution is similar to the composition of the electrolytic solution in the first secondary battery. However, in the electrolyte 56 as the gel electrolyte, the solvent in the electrolytic solution means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gel electrolyte 56 in which the electrolytic solution is held by the polymer compound, the electrolytic solution may be directly used. In this case, the electrolytic solution is impregnated in the separator 55.

The secondary battery including the gel electrolyte 56 is manufactured, for example, by the following three procedures.

In the first manufacturing method, first, for example, the cathode 53 is formed by forming the cathode active material layer 53B on both faces of the cathode current collector 53A, and the anode 54 is formed by forming the anode active material layer 54B on both faces of the anode current collector 54A by a procedure similar to the procedure of forming the cathode 21 and the anode 22 in the foregoing first secondary battery. Subsequently, a precursor solution containing an electrolytic solution, a polymer compound, and a solvent is prepared. After the cathode 53 and the anode 54 are coated with the precursor solution, the solvent is volatilized to form the gel electrolyte 56. Subsequently, the cathode lead 51 is attached to the cathode current collector 53A, and the anode lead 52 is attached to the anode current collector 54A. Subsequently, the cathode 53 and the anode 54 provided with the electrolyte 56 are layered with the separator 55 in between and spirally wound to obtain a laminated body. After that, the protective tape 57 is adhered to the outermost periphery thereof to form the spirally wound electrode body 50. Finally, for example, after the spirally wound electrode body 50 is sandwiched between 2 pieces of the film package members 60, outer edges of the package members 60 are contacted by thermal fusion bonding or the like to enclose the spirally wound electrode body 50. At this time, the adhesive films 61 are inserted between the cathode lead 51, the anode lead 52 and the package member 60. Thereby, the secondary battery illustrated in FIG. 8 and FIG. 9 is completed.

In the second manufacturing method, first, the cathode lead 51 is attached to the cathode 53, and the anode lead 52 is attached to the anode 54. Subsequently, the cathode 53 and the anode 54 are layered with the separator 55 in between and spirally wound. After that, the protective tape 57 is adhered to the outermost periphery thereof, and thereby a spirally wound body as a precursor of the spirally wound electrode body 50 is formed. Subsequently, after the spirally wound body is sandwiched between 2 pieces of the film package members 60, the outermost peripheries except for one side are bonded by thermal fusion bonding or the like to obtain a pouched state, and the spirally wound body is contained in the pouch-like package member 60. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 60. After that, the opening of the package member 60 is hermetically sealed by thermal fusion bonding or the like. Finally, the monomer is thermally polymerized to obtain a polymer compound. Thereby, the gel electrolyte 56 is formed. Accordingly, the secondary battery is completed.

In the third manufacturing method, the spirally wound body is formed and contained in the pouch-like package member 60 in the same manner as that of the foregoing second manufacturing method, except that the separator 55 with both faces coated with a polymer compound is used firstly. As the polymer compound with which the separator 55 is coated, for example, a polymer containing vinylidene fluoride as a component, that is, a homopolymer, a copolymer, a multicomponent copolymer and the like are included. Specifically, polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like are included. As a polymer compound, in addition to the foregoing polymer containing vinylidene fluoride as a component, another one or more polymer compounds may be contained. Subsequently, an electrolytic solution is prepared and injected into the package member 60. After that, the opening of the package member 60 is sealed by thermal fusion bonding or the like. Finally, the resultant is heated while a weight is applied to the package member 60, and the separator 55 is contacted with the cathode 53 and the anode 54 with the polymer compound in between. Thereby, the electrolytic solution is impregnated into the polymer compound, and the polymer compound is gelated to form the electrolyte 56. Accordingly, the secondary battery is completed.

In the third manufacturing method, the swollenness of the secondary battery is prevented compared to the first manufacturing method. Further, in the third manufacturing method, the monomer, the solvent and the like as a raw material of the polymer compound are hardly remain in the electrolyte 56 compared to the second manufacturing method. In addition, the formation step of the polymer compound is favorably controlled. Thus, sufficient adhesion are obtained between the cathode 53/the anode 54/the separator 55 and the electrolyte 56.

According to the laminated film secondary battery, the anode 54 has the structure similar to that of the foregoing anode. Thus, the cycle characteristics and the swollenness characteristics are able to be improved. Effect of the secondary battery other than the foregoing effect is similar to that of the first secondary battery.

EXAMPLES

Examples of the invention will be described in detail

Example 1-1

The laminated film secondary battery illustrated in FIG. 8 and FIG. 9 was fabricated by the following procedure. The secondary battery was fabricated as a lithium ion secondary battery in which the capacity of the anode 54 was expressed based on insertion and extraction of lithium.

First, the cathode 53 was formed. First, lithium carbonate ($Li_2CO_3$) and cobalt carbonate ($COCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by mass of the lithium cobalt complex oxide as a cathode active material, 6 parts by mass of graphite as a cathode electrical conductor, and 3 parts by mass of polyvinylidene fluoride as a cathode binder were mixed to obtain a cathode mixture. After that, the cathode mixture was dispersed in N-methyl-2-pyrrolidone to obtain paste cathode mixture slurry. Finally, both faces of the cathode current collector 53A made of a strip-shaped aluminum foil (thickness was 12 μm) were uniformly coated with the cathode mixture slurry, which was dried. After that, the resultant was compression-molded by a roll pressing machine to form the cathode active material layer 53B.

Next, the anode 54 was formed. First, the anode current collector 54A made of a roughened electrolytic copper foil (thickness was 15 μm, and ten point height of roughness profile Rz was 3 μm) was prepared. Subsequently, silicon powder (median size was 5 μm) as an anode active material and a polyamic acid solution as a precursor of an anode binder were mixed at a dry weight ratio of 80:20. After that, the mixture was dispersed in N-methyl-2-pyrrolidone to obtain a paste as anode mixture slurry having a given viscosity. Subsequently, both faces of the anode current collector 54A were uniformly coated with the anode mixture slurry by using a coating device, and the resultant was dried. After that, according to needs, the coating was compression-molded by using a rolling press machine. Finally, the coating was provided with heat treatment in the vacuum atmosphere under conditions of 400 deg C.×1 hour. Thereby, polyimide (P1) was generated as an anode binder. In addition, part of the polyimide was carbonized and thereby the anode active material layer 54B was formed. The anode active material layer 54B was formed so that only one peak existed when the distribution of change rate of mercury intrusion was measured for the anode 54 and the pore diameter of the peak was 30 nm. The porosity was 20%. To measure the foregoing change rate of mercury intrusion, a mercury porosimeter manufactured by Micromeritics Instrument Corporation (Autopore 9500 series) was used, and a piece of the anode 54 cut in a size of 25 mm×350 mm was measured.

Next, ethylene carbonate (EC) and diethyl carbonate (DEC) were mixed as a solvent. After that, lithium hexafluorophosphate ($LiPF_6$) as an electrolyte salt was dissolved in the solvent to prepare an electrolytic solution. The solvent composition (EC:DEC) was 50:50 at a weight ratio. The content of the electrolyte salt to the solvent was 1 mol/kg.

Finally, the secondary battery was assembled by using the cathode 53, the anode 54, and the electrolytic solution. First, the cathode lead 51 made of aluminum was welded to one end of the cathode current collector 53A, and the anode lead 52 made of nickel was welded to one end of the anode current collector 54A. Subsequently, the cathode 53, the separator 55 (thickness was 23 μm) having a 3-layer structure in which a film made of a microporous polyethylene as a main component was sandwiched between films made of a microporous polypropylene as a main component, and the anode 54, and the foregoing separator 55 were layered in this order and spirally wound in the longitudinal direction. After that, the end portion of the spirally wound body was fixed by the protective tape 57 made of an adhesive tape, and thereby a spirally wound body as a precursor of the spirally wound electrode body 50 was formed. Subsequently, the spirally wound body was sandwiched between the package members 60 made of a 3-layer laminated film (total thickness was 100 μm) in which a nylon film (thickness was 30 μm), an aluminum foil (thickness was 40 μm), and a cast polypropylene film (thickness was 30 μm) were layered from the outside. After that, outer edges other than an edge of one side of the package members 60 were thermally fusion-bonded to each other. Thereby, the spirally wound body was contained in the package members 60 in a pouched state. Subsequently, the electrolytic solution was injected through the opening of the package member 60, the electrolytic solution was impregnated in the separator 55, and thereby the spirally wound electrode body 50 was formed. Finally, the opening of the package member 60 was sealed by thermal fusion bonding in the vacuum atmosphere, and thereby the laminated film secondary battery was completed.

For the secondary battery, lithium metal was not precipitated on the anode 54 in the full charge state by adjusting the thickness of the cathode active material layer 53B. Further, the anode utilization was set to 50% by adjusting the ratio between the capacity of the cathode 53 and the capacity of the anode 54.

Examples 1-2 to 1-11

A procedure was performed in the same manner as that of Example 1-1, except that the pore diameter of the peak was changed to 50 μm (Example 1-2), 100 μm (Example 1-3), 200 μm (Example 1-4), 500 μm (Example 1-5), 700 μm (Example 1-6), 1000 μm (Example 1-7), 2000 μm (Example 1-8), 5000 μm (Example 1-9), 7000 μm (Example 1-10), or 10000 μm (Example 1-11). The pore diameter of the peak was changed by adjusting conditions such as the content of the anode binder in the anode active material layer 54B, the press pressure in compression molding, and heat treatment temperature.

Comparative examples 1-1 to 1-3

A procedure was performed in the same manner as that of Example 1-1, except that the pore diameter of the peak was changed to 15 μm (Comparative example 1-1), 25 μm (Comparative example 1-2), or 20000 μm (Comparative example 1-3).

The cycle characteristics and the swollenness characteristics for the secondary batteries of Examples 1-1 to 1-11 and Comparative examples 1-1 to 1-3 were examined. The results illustrated in Table 1 and FIG. 10 were obtained. The result of measuring the distribution of change rate of mercury intrusion for the anode 54 of Example 1-5 is as illustrated in FIG. 11.

In examining the cycle characteristics, a cycle test was performed, and thereby the discharge capacity retention ratio was obtained. Specifically, first, to stabilize the battery state, after charge and discharge were performed in the atmosphere at 23 deg C., charge and discharge were performed again. Thereby, the discharge capacity at the second cycle was measured. Subsequently, the secondary battery was charged and discharged 99 cycles in the same atmosphere, and thereby the discharge capacity at the 101st cycle was measured. Finally, the discharge capacity retention ratio (%)=(discharge capacity at the 101st cycle/discharge capacity at the second cycle)×100 was calculated. The charge condition was as follows. That is, after charge was performed at the constant current density of 3 $mA/cm^2$ until the battery voltage reached 4.2 V, charge was continuously performed at the constant voltage of 4.2 V until the battery density reached 0.3 $mA/cm^2$. The discharge conditions were as follows. That is, discharge was performed at the constant current density of 3 $mA/cm^2$ until the battery voltage reached 2.5 V.

In examining the swollenness characteristics, the foregoing cycle test was performed and thereby the swollenness ratio was obtained. Specifically, first, to stabilize the battery state, after charge and discharge were performed in the atmosphere at 23 deg C., the thickness before the cycle test was measured. Subsequently, after the cycle test was performed, the thickness after the cycle test was measured. Finally, the swollenness ratio (%)=[(thickness after the cycle test−thickness before the cycle test)/thickness before the cycle test]×100 was calculated.

The procedures and the conditions in examining the cycle characteristics and the swollenness characteristics are similarly applied to the evaluation of the same characteristics for the following examples and comparative examples.

TABLE 1

Anode active material: silicon
Ten point height of roughness profile Rz: 3 μm
Anode utilization: 50%

| | Anode active material layer | | | | | |
|---|---|---|---|---|---|---|
| | Anode active material | | Anode binder | | | Discharge |
| | Median size (μm) | Porosity (%) | Type | Heat treatment temperature (deg C.) | Pore diameter of peak (nm) | capacity retention ratio (%) | Swollenness ratio (%) |
| Example 1-1 | 5 | 20 | PI | 400 | 30 | 72 | 9 |
| Example 1-2 | | | | | 50 | 75 | 6 |
| Example 1-3 | | | | | 100 | 80 | 2.2 |
| Example 1-4 | | | | | 200 | 82 | 1.6 |
| Example 1-5 | | | | | 500 | 84 | 1.3 |
| Example 1-6 | | | | | 700 | 85 | 1.2 |
| Example 1-7 | | | | | 1000 | 85 | 1.2 |
| Example 1-8 | | | | | 2000 | 84 | 1.2 |
| Example 1-9 | | | | | 5000 | 83 | 1.1 |
| Example 1-10 | | | | | 7000 | 82 | 1.1 |
| Example 1-11 | | | | | 10000 | 80 | 1.1 |
| Comparative example 1-1 | 5 | 20 | PI | 400 | 15 | 35 | 20 |
| Comparative example 1-2 | | | | | 25 | 55 | 14 |
| Comparative example 1-3 | | | | | 20000 | 57 | 1 |

Figure 10:
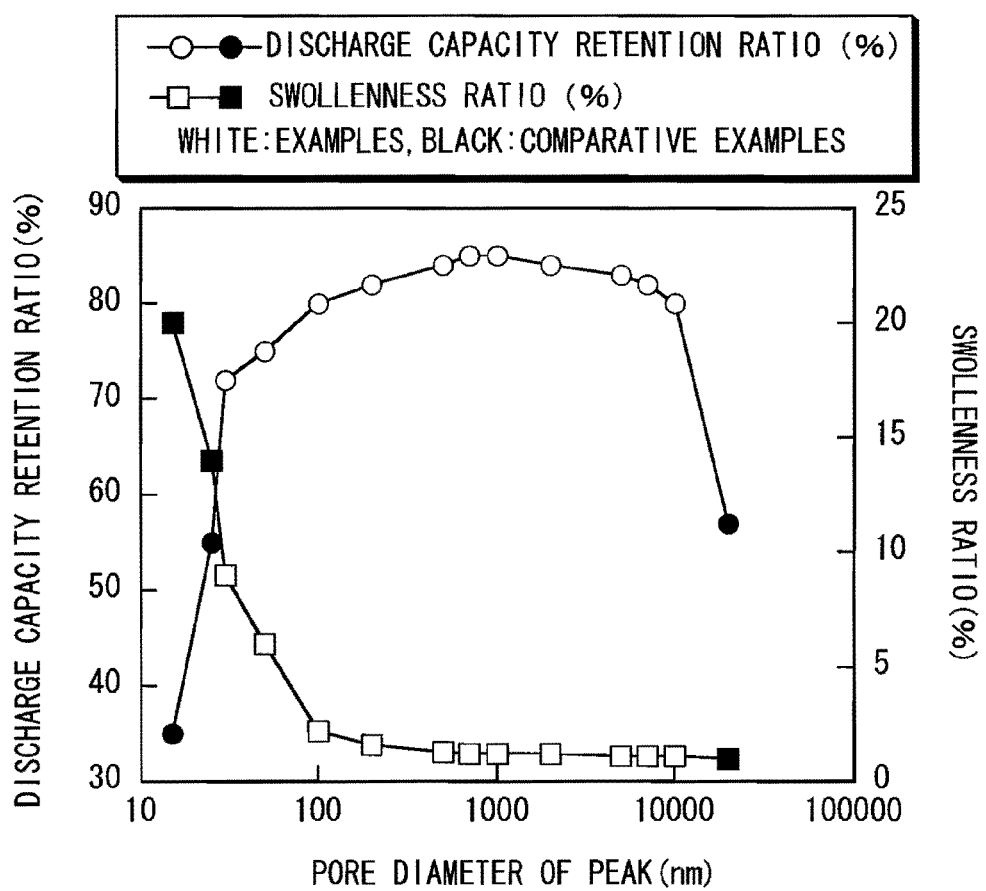
FIG. 10 is a diagram illustrating a relation between a pore diameter of a peak and a discharge capacity retention ratio/a swollenness ratio.
Figure 11:
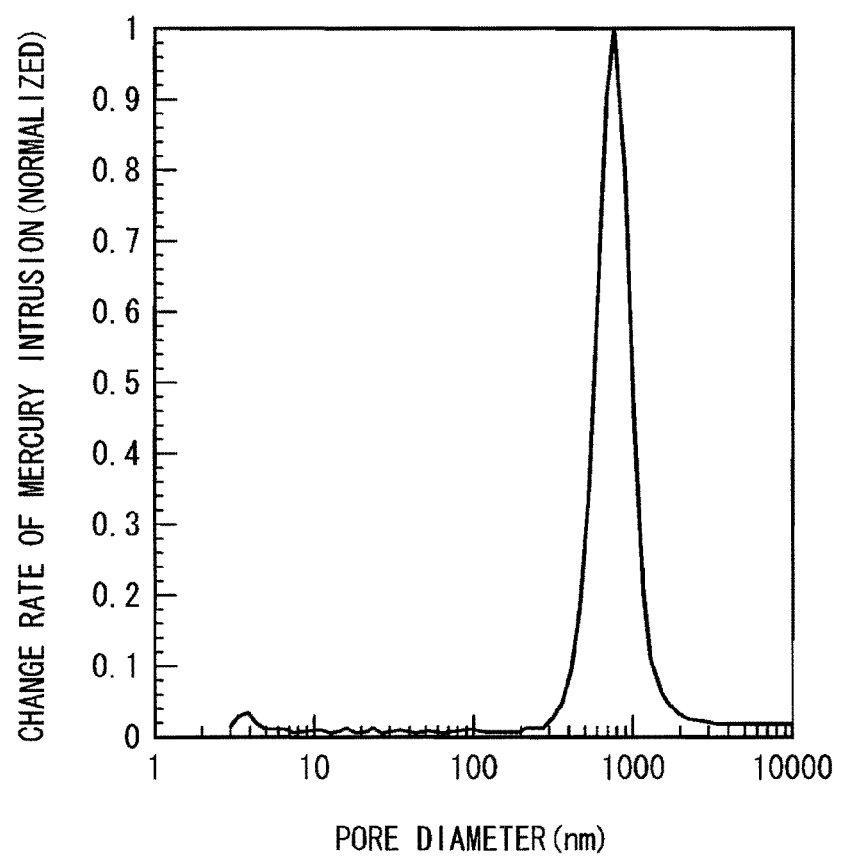
FIG. 11 is a diagram illustrating a distribution of a change rate of mercury intrusion measured for an anode of Example 1-5.

As illustrated in Table 1 and FIG. 10, in the case where the change rate of mercury intrusion was distributed to show only one peak, in Examples 1-1 to 1-11 in which the pore diameter of the peak was in the range from 30 nm to 10000 nm, both inclusive, compared to in Comparative examples 1-1 to 1-3 in which the pore diameter of the peak was under 30 nm or over 10000 nm, a high discharge capacity retention ratio of 70% or more was obtained, and a small swollenness ratio of less than 10% was obtained. The result showed that in the case where the change rate of mercury intrusion was distributed to show the peak in the pore diameter range from 30 nm to 10000 nm, both inclusive, a sufficient number of fine pores with a sufficient pore diameter to secure a spare space in the anode active material layer 43B was obtained. Thereby, in charge and discharge, expansion and shrinkage of the anode active material layer 2 were prevented, and the internal stress associated therewith was relaxed. Thus, while increase of the swollenness ratio was prevented, the discharge capacity retention ratio was increased.

In particular, in Examples 1-1 to 1-11, in the case where the pore diameter of the peak was 100 nm or more, the swollenness ratio was significantly small. In this case, in the case where the pore diameter of the peak was 5000 nm or less, while keeping the swollenness ratio to a minimum, a high discharge capacity retention ratio was obtained.

Accordingly, it was confirmed that in the secondary battery of the embodiment of the invention, in the case where the anode active material layer 54B containing the anode active material (silicon) and the anode binder (polyimide) had the plurality of fine pores, the change rate of mercury intrusion into the plurality of fine pores measured by mercury penetration technique was distributed to show only one peak, and the peak was shown in the pore diameter range from 30 nm to 10000 nm, both inclusive, the cycle characteristics and the swollenness characteristics were improved. It was also confirmed that in this case, in the case where the peak was shown in the pore diameter range from 100 nm to 5000 nm, both inclusive, both characteristics were further improved.

Examples 2-1 to 2-16

A procedure was performed in the same manner as that of Example 1-1, except that the change rate of mercury intrusion showed two peaks and the pore diameter of the two peaks were adjusted. Specifically, the pore diameters of the two peaks were 15 nm and 700 nm (Example 2-1), 25 nm and 1000 nm (Example 2-2), 100 nm and 500 nm (Example 2-3), 200 nm and 500 nm (Example 2-4), 100 nm and 700 nm (Example 2-5), 200 nm and 700 nm (Example 2-6), 100 nm and 1000 nm (Example 2-7), 150 nm and 1300 nm (Example 2-8), 500 nm and 1000 nm (Example 2-9), 700 nm and 6000 nm (Example 2-10), 900 nm and 1500 nm (Example 2-11), 1000 nm and 5000 nm (Example 2-12), 15 nm and 700 nm (Example 2-13), 100 nm and 500 nm (Example 2-14), 200 nm and 700 nm (Example 2-15), or 700 nm and 6000 nm (Example 2-16). The number of peaks and the pore diameter were changed by adjusting conditions such as the content of the anode binder in the anode active material layer 54B, the press pressure in compression molding, and heat treatment temperature.

Comparative Examples 2-1 and 2-2

A procedure was performed in the same manner as that of Examples 2-1 to 2-16, except that the pore diameter of the two peaks was changed to 15 nm and 25 nm (Comparative example 2-1) or 20000 nm and 30000 nm (Comparative example 2-2).

Figure 12:
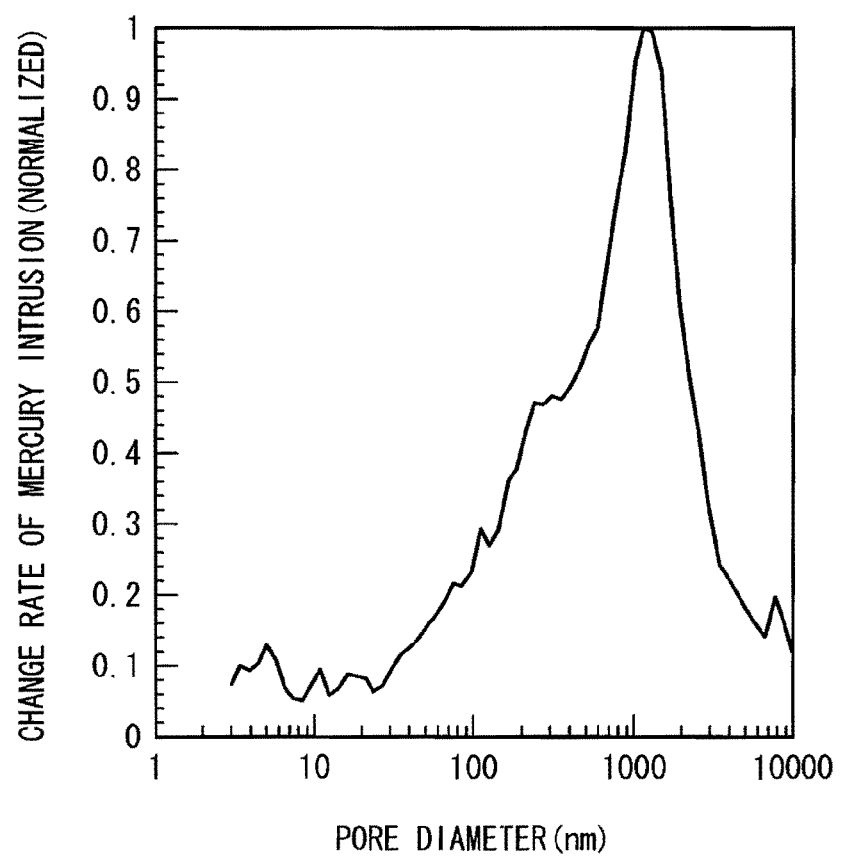
FIG. 12 is a diagram illustrating a distribution of a change rate of mercury intrusion measured for an anode of Example 2-7.
Figure 13:
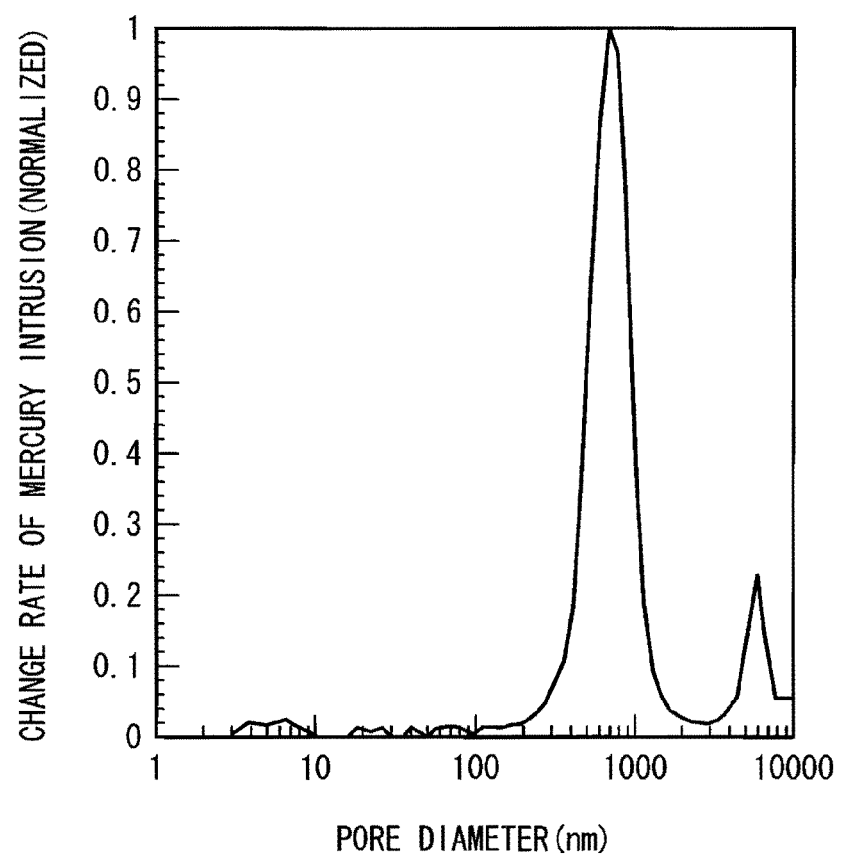
FIG. 13 is a diagram illustrating a distribution of a change rate of mercury intrusion measured for an anode of Example 2-10.
Figure 14:
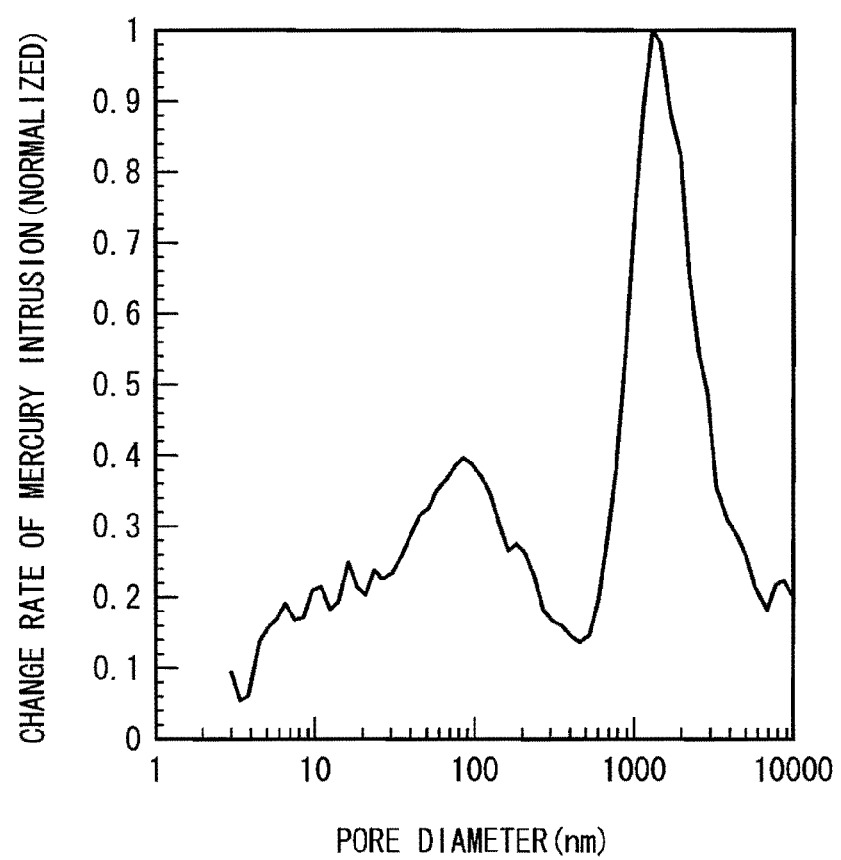
FIG. 14 is a diagram illustrating a distribution of a change rate of mercury intrusion measured for an anode of Example 2-11.

The cycle characteristics and the swollenness characteristics for the secondary batteries of Examples 2-1 to 2-16 and Comparative examples 2-1 and 2-2 were examined. The results shown in Table 2 were obtained. The results of measuring the distribution of change rate of mercury intrusion for the anode 54 of Examples 2-7, 2-10, and 2-11 are respectively as illustrated in FIG. 12 to FIG. 14.

TABLE 2

| | Anode active material: silicon<br>Ten point height of roughness profile Rz: 3 μm<br>Anode utilization: 50% | | | | | | | |
|---|---|---|---|---|---|---|---|---|
| | Anode active material layer | | | | | | Discharge capacity | |
| | Anode active material | | Anode binder | | Pore diameter of peak (nm) | | retention ratio | Swollenness ratio |
| | Median size (μm) | Porosity (%) | Type | Heat treatment temperature (deg C.) | Maximum | Other | (%) | (%) |
| Example 2-1 | 5 | 20 | PI | 400 | 700 | 15 | 82 | 1.8 |
| Example 2-2 | | | | | 1000 | 25 | 83 | 1.5 |
| Example 2-3 | | | | | 500 | 100 | 83 | 1.5 |
| Example 2-4 | | | | | 500 | 200 | 84 | 1.4 |
| Example 2-5 | | | | | 700 | 100 | 83 | 1.35 |
| Example 2-6 | | | | | 700 | 200 | 84 | 1.3 |
| Example 2-7 | | | | | 1000 | 100 | 84 | 1.3 |
| Example 2-8 | | | | | 1300 | 150 | 83 | 1.2 |
| Example 2-9 | | | | | 1000 | 500 | 82 | 1.2 |
| Example 2-10 | | | | | 700 | 6000 | 82 | 1.2 |
| Example 2-11 | | | | | 900 | 1500 | 83 | 1.2 |
| Example 2-12 | | | | | 1000 | 5000 | 82 | 1.1 |
| Example 2-13 | | | | | 15 | 700 | 70 | 3.5 |
| Example 2-14 | | | | | 100 | 500 | 72 | 3.6 |
| Example 2-15 | | | | | 200 | 700 | 71 | 2.9 |
| Example 2-16 | | | | | 6000 | 700 | 73 | 2.8 |
| Comparative example 2-1 | 5 | 20 | PI | 400 | 25 | 15 | 31 | 19.5 |
| Comparative example 2-2 | | | | | 20000 | 30000 | 54 | 1 |

As shown in Table 2, in the case where the change rate of mercury intrusion showed two peaks, results similar to those of Table 1 were obtained as well. That is, in Examples 2-1 to 2-16 in which the pore diameter of one or two peaks out of two peaks were in the range from 30 nm to 10000 nm, both inclusive, compared to in Comparative examples 2-1 and 2-2 in which the pore diameter of two peaks were under 30 nm or over 10000 nm, a high discharge capacity retention ratio of 70% or more was obtained, and a small swollenness ratio of less than 10% was obtained.

In particular, among Examples 2-1 to 2-16, in Examples 2-1 to 2-12 in which the pore diameter of the maximum peak (peak indicating the maximum value) was in the range from 100 nm to 5000 nm, both inclusive, compared to Examples 2-13 to 2-16 in which the pore diameter of the maximum peak was under 100 nm or over 5000 nm, the discharge capacity retention ratio was higher, and the swollenness ratio was smaller.

Accordingly, it was confirmed that in the secondary battery of the embodiment of the invention, in the case where the anode active material layer 54B containing the anode active material (silicon) and the anode binder (polyimide) had the plurality of fine pores, the change rate of mercury intrusion into the plurality of fine pores measured by mercury penetration technique was distributed to show two peaks, and the peak was shown in the pore diameter range from 30 nm to 10000 nm, both inclusive, the cycle characteristics and the swollenness characteristics were improved as well. It was also confirmed that in this case, in the case where the maximum peak out of the two peaks existed in the pore diameter range from 100 nm to 5000 nm, both inclusive, both characteristics were further improved.

Examples 3-1 to 3-3

A procedure was performed in the same manner as that of Example 1-6, except that as an anode active material, a silicon alloy, specifically a silicon iron alloy (Example 3-1), a silicon titanium alloy (Example 3-2), or silicon cobalt alloy (Example 3-3) was used instead of silicon. In forming the silicon alloy, first, metal element powder (iron, titanium, or cobalt) was added to silicon powder and dry-mixed. The additive amount of the metal element powder was 5 atomic % for iron, 10 atomic % for titanium, and 20 atomic % for cobalt. Subsequently, 10 g of the foregoing mixture and about 400 g of a corundum having a diameter of 9 mm were set together in a reactive vessel of a planetary ball mill of Itoh Seisakusho Co., Ltd. Subsequently, inside of the reactive vessel was substituted with argon atmosphere. After that, 10 minute operation at 250 rpm and 10 minute stop were repeated until the total operation time became 20 hours. Subsequently, the reactive vessel was cooled down to room temperature, and the silicon alloy was taken out. After that, coarse grain was removed therefrom with the use of a 280 mesh sieve.

The cycle characteristics and the swollenness characteristics for the secondary batteries of Examples 3-1 to 3-3 were examined. The results shown in Table 3 were obtained.

TABLE 3

Anode active material: silicon
Ten point height of roughness profile Rz: 3 μm
Anode utilization: 50%

| | Anode active material layer | | | | | | |
|---|---|---|---|---|---|---|---|
| | Anode active material | | Anode binder | | | Discharge capacity | |
| | Metal element | Median size (μm) | Porosity (%) | Type | Heat treatment temperature (deg C.) | Pore diameter of peak (nm) | retention ratio (%) | Swollenness ratio (%) |
| Example 1-6 | — | 5 | 20 | PI | 400 | 700 | 85 | 1.2 |
| Example 3-1 | Fe | | | | | | 87 | 1.2 |
| Example 3-2 | Ti | | | | | | 86 | 1.2 |
| Example 3-3 | Co | | | | | | 86.5 | 1.2 |
| Comparative example 1-1 | — | 5 | 20 | PI | 400 | 15 | 35 | 20 |
| Comparative example 1-2 | | | | | | 25 | 55 | 14 |
| Comparative example 1-3 | | | | | | 20000 | 57 | 1 |

As shown in Table 3, in the case where the silicon alloy was used as an anode active material, results similar to those of Table 1 were obtained as well. That is, in Examples 3-1 to 3-3 in which the pore diameter of the peak was in the range from 30 nm to 10000 nm, both inclusive, compared to in Comparative examples 1-1 to 1-3 in which the pore diameter of the peak was under 30 nm or over 10000 nm, a high discharge capacity retention ratio of 80% or more was obtained, and a small swollenness ratio of less than 10% was obtained as in Example 1-6.

In particular, in Examples 3-1 to 3-3 in which the silicon alloy was used, compared to Example 1-6 in which silicon was used, the discharge capacity retention ratio was higher while the swollenness ratio was maintained constant.

Accordingly, it was confirmed that in the secondary battery of the embodiment of the invention, in the case where the anode active material layer 54B containing the anode active material (silicon alloy) and the anode binder (polyimide) had the plurality of fine pores, the change rate of mercury intrusion into the plurality of fine pores measured by mercury penetration technique showed a peak in the pore diameter range from 30 nm to 10000 nm, both inclusive, the cycle characteristics and the swollenness characteristics were improved as well. It was also confirmed that in this case, in the case where the silicon alloy was used as an anode active material, the cycle characteristics were further improved.

Examples 4-1 to 4-11

A procedure was performed in the same manner as that of Example 1-6, except that the porosity of the anode active material layer 54B was changed to 2% (Example 4-1), 3% (Example 4-2), 4% (Example 4-3), 5% (Example 4-4), 8% (Example 4-5), 10% (Example 4-6), 30% (Example 4-7), 50% (Example 4-8), 70% (Example 4-9), 75% (Example 4-10), or 80% (Example 4-11). The porosity was changed by adjusting conditions such as the content of the anode binder in the anode active material layer 54B, the press pressure in compression molding, and the heat treatment temperature.

The cycle characteristics and the swollenness characteristics for the secondary batteries of Examples 4-1 to 4-11 were examined. The results illustrated in Table 4 and FIG. 15 were obtained.

TABLE 4

Anode active material: silicon
Ten point height of roughness profile Rz: 3 μm
Anode utilization: 50%

| | Anode active material layer | | | | | | |
|---|---|---|---|---|---|---|---|
| | Anode active material | | Anode binder | | | Discharge capacity | |
| | Median size (μm) | Porosity (%) | Type | Heat treatment temperature (deg C.) | Pore diameter of peak (nm) | retention ratio (%) | Swollenness ratio (%) |
| Example 4-1 | 5 | 2 | PI | 400 | 700 | 60 | 12 |
| Example 4-2 | | 3 | | | | 64 | 10.5 |
| Example 4-3 | | 4 | | | | 80 | 5 |
| Example 4-4 | | 5 | | | | 82 | 3 |
| Example 4-5 | | 8 | | | | 83 | 2.5 |
| Example 4-6 | | 10 | | | | 84 | 1.7 |
| Example 1-6 | | 20 | | | | 85 | 1.2 |
| Example 4-7 | | 30 | | | | 84 | 1.1 |

TABLE 4-continued

Anode active material: silicon
Ten point height of roughness profile Rz: 3 μm
Anode utilization: 50%

| | Anode active material layer | | | | | | |
|---|---|---|---|---|---|---|---|
| | Anode active material | | Anode binder | | | Discharge | |
| | Median size (μm) | Porosity (%) | Type | Heat treatment temperature (deg C.) | Pore diameter of peak (nm) | capacity retention ratio (%) | Swollenness ratio (%) |
| Example 4-8 | | 50 | | | | 83 | 1.1 |
| Example 4-9 | | 70 | | | | 81 | 1 |
| Example 4-10 | | 75 | | | | 65 | 0.9 |
| Example 4-11 | | 80 | | | | 61 | 0.9 |
| Comparative example 1-1 | 5 | 20 | PI | 400 | 15 | 35 | 20 |
| Comparative example 1-2 | | | | | 25 | 55 | 14 |
| Comparative example 1-3 | | | | | 20000 | 57 | 1 |

Figure 15:
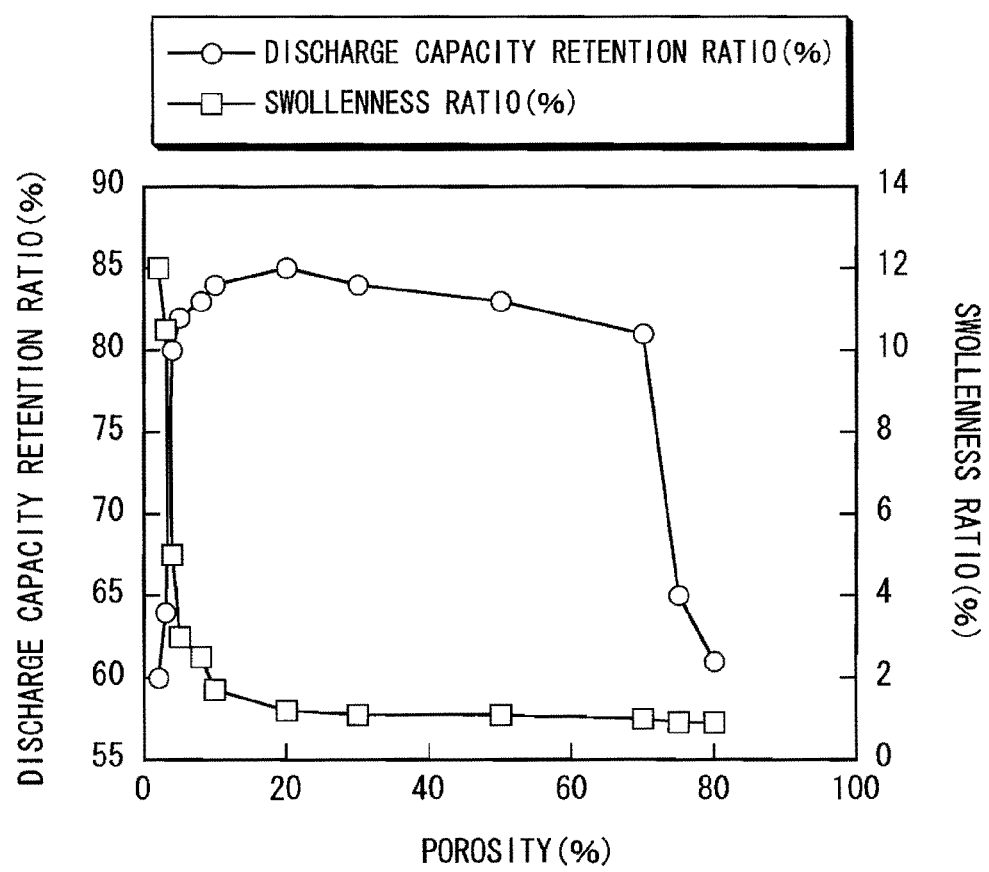
FIG. 15 is a diagram illustrating a relation between a porosity and a discharge capacity retention ratio/a swollenness ratio.

As illustrated in Table 4 and FIG. 15, in the case where the porosity of the anode active material layer 54B was changed, results similar to those of Table 1 were obtained as well. That is, in Examples 4-1 to 4-11 in which the pore diameter of the peak was in the range from 30 nm to 10000 nm, both inclusive, compared to in Comparative examples 1-1 to 1-3 in which the pore diameter of the peak was under 30 nm or over 10000 nm, a high discharge capacity retention ratio of 60% or more was obtained, and a small swollenness ratio of 10% or less was obtained as in Example 1-6.

In particular, in Examples 4-1 to 4-11, there was a tendency that as the porosity was increased, the discharge capacity retention ratio was increased and then decreased and the swollenness ratio was decreased. In this case, in the case where the porosity was in the range from 4% to 70%, both inclusive, a high discharge capacity retention ratio of 80% or more was obtained, and a small swollenness ratio of less than 10% was obtained. Further, in the case where the porosity was in the range from 20% to 30%, both inclusive, the discharge capacity retention ratio was almost maximum, and the swollenness ratio was almost minimum.

Accordingly, it was confirmed that in the secondary battery of the embodiment of the invention, in the case where the porosity of the anode active material layer 54B was changed, the cycle characteristics and the swollenness characteristics were improved as well. It was also confirmed that in this case, in the case where the porosity was in the range from 4% to 70%, both inclusive, or preferably in the range from 20% to 30%, both inclusive, both characteristics were further improved.

Examples 5-1 to 5-8

A procedure was performed in the same manner as that of Example 1-6, except that the median size of the anode active material was changed to 0.2 μm (Example 5-1), 0.3 μm (Example 5-2), 0.5 μm (Example 5-3), 1 μm (Example 5-4), 10 μm (Example 5-5), 20 μm (Example 5-6), 30 μm (Example 5-7), or 40 μm (Example 5-8).

The cycle characteristics and the swollenness characteristics for the secondary batteries of Examples 5-1 to 5-8 were examined. The results illustrated in Table 5 and FIG. 16 were obtained.

TABLE 5

Anode active material: silicon
Ten point height of roughness profile Rz: 3 μm
Anode utilization: 50%

| | Anode active material layer | | | | | | |
|---|---|---|---|---|---|---|---|
| | Anode active material | | Anode binder | | | Discharge | |
| | Median size (μm) | Porosity (%) | Type | Heat treatment temperature (deg C.) | Pore diameter of peak (nm) | capacity retention ratio (%) | Swollenness ratio (%) |
| Example 5-1 | 0.2 | 20 | PI | 400 | 700 | 76 | 1.3 |
| Example 5-2 | 0.3 | | | | | 78 | 1.3 |
| Example 5-3 | 0.5 | | | | | 81 | 1.2 |
| Example 5-4 | 1 | | | | | 83 | 1.2 |
| Example 1-6 | 5 | | | | | 85 | 1.2 |
| Example 5-5 | 10 | | | | | 85 | 1.2 |
| Example 5-6 | 20 | | | | | 82 | 1.2 |

TABLE 5-continued

Anode active material: silicon
Ten point height of roughness profile Rz: 3 μm
Anode utilization: 50%

| | Anode active material layer | | | | | | |
|---|---|---|---|---|---|---|---|
| | Anode active material | | Anode binder | | Pore | Discharge capacity | |
| | Median size (μm) | Porosity (%) | Type | Heat treatment temperature (deg C.) | diameter of peak (nm) | retention ratio (%) | Swollenness ratio (%) |
| Example 5-7 | 30 | | | | | 79 | 1.3 |
| Example 5-8 | 40 | | | | | 77 | 1.4 |
| Comparative example 1-1 | 5 | 20 | PI | 400 | 15 | 35 | 20 |
| Comparative example 1-2 | | | | | 25 | 55 | 14 |
| Comparative example 1-3 | | | | | 20000 | 57 | 1 |

Figure 16:
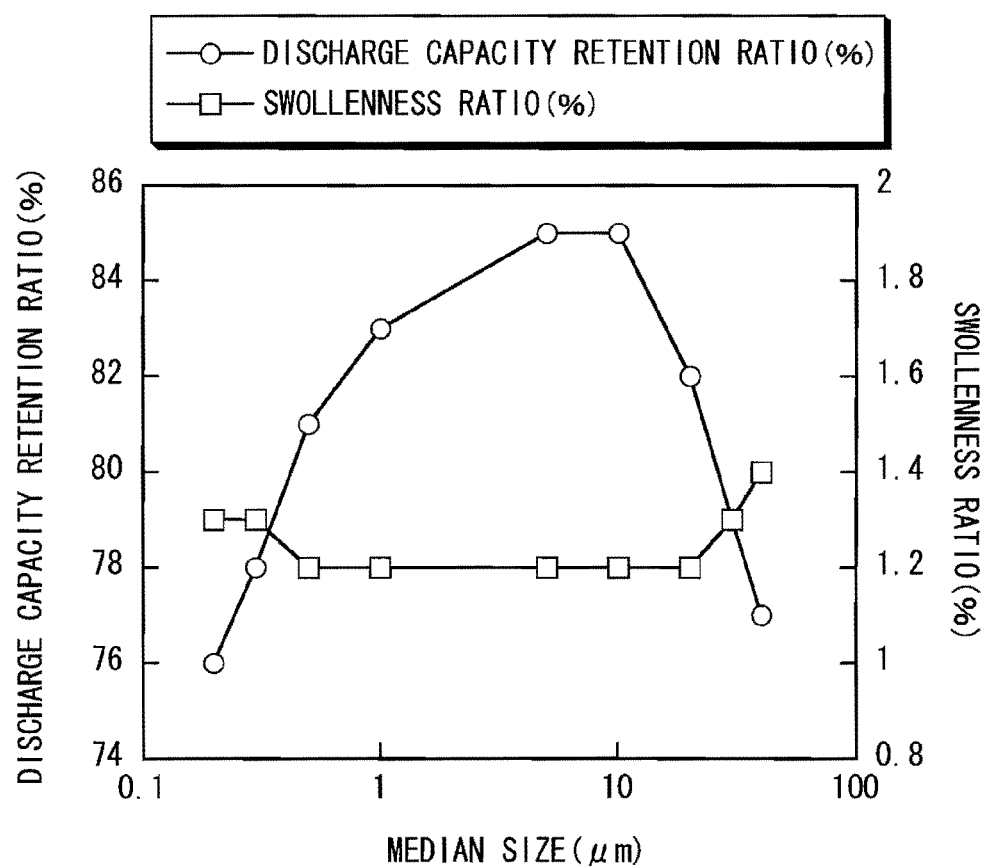
FIG. 16 is a diagram illustrating a relation between a median size and a discharge capacity retention ratio/a swollenness ratio.

As illustrated in Table 5 and FIG. 16, in the case where the median size of the anode active material was changed, results similar to those of Table 1 were obtained as well. That is, in Examples 5-1 to 5-8 in which the pore diameter of the peak was in the range from 30 nm to 10000 nm, both inclusive, compared to in Comparative examples 1-1 to 1-3 in which the pore diameter of the peak was under 30 nm or over 10000 nm, a high discharge capacity retention ratio of 70% or more was obtained, and a small swollenness ratio of less than 10% was obtained as in Example 1-6.

In particular, in Examples 5-1 to 5-8, there was a tendency that as the median size was increased, the discharge capacity retention ratio was increased and then decreased and the swollenness ratio became almost constant. In this case, in the case where the median size was in the range from 0.5 μm to 20 μm, both inclusive, a high discharge capacity retention ratio of 80% or more was obtained.

Accordingly, it was confirmed that in the secondary battery of the embodiment of the invention, in the case where the median size of the anode active material was changed, the cycle characteristics and the swollenness characteristics were improved as well. It was also confirmed that in this case, in the case where the median size was in the range from 0.5 μm to 20 μm, both inclusive, the cycle characteristics were further improved.

Examples 6-1 to 6-5

A procedure was performed in the same manner as that of Example 1-6, except that the heat treatment temperature was changed to 500 deg C. (Example 6-1), 600 deg C. (Example 6-2), 700 deg C. (Example 6-3), 800 deg C. (Example 6-4), or 900 deg C. (Example 6-5).

The cycle characteristics and the swollenness characteristics for the secondary batteries of Examples 6-1 to 6-5 were examined. The results shown in Table 6 were obtained.

TABLE 6

Anode active material: silicon
Ten point height of roughness profile Rz: 3 μm
Anode utilization: 50%

| | Anode active material layer | | | | | | |
|---|---|---|---|---|---|---|---|
| | Anode active material | | Anode binder | | Pore | Discharge capacity | |
| | Median size (μm) | Porosity (%) | Type | Heat treatment temperature (deg C.) | diameter of peak (nm) | retention ratio (%) | Swollenness ratio (%) |
| Example 1-6 | 5 | 20 | PI | 400 | 700 | 85 | 1.2 |
| Example 6-1 | | | | 500 | | 86 | 1.2 |
| Example 6-2 | | | | 600 | | 87 | 1.2 |
| Example 6-3 | | | | 700 | | 89 | 1.2 |
| Example 6-4 | | | | 800 | | 90 | 1.2 |
| Example 6-5 | | | | 900 | | 83 | 1.2 |

As shown in Table 6, in the case where the heat treatment temperature was changed, results similar to those of Table 1 were obtained as well. That is, in Examples 6-1 to 6-5 in which the pore diameter of the peak was in the range from 30 nm to 10000 nm, both inclusive, compared to in Comparative examples 1-1 to 1-3 in which the pore diameter of the peak was under 30 nm or over 10000 nm, a high discharge capacity retention ratio of 80% or more was obtained, and a small swollenness ratio of less than 10% was obtained as in Example 1-6.

In particular, in Examples 6-1 to 6-5, there was a tendency that as the heat treatment temperature was increased, the discharge capacity retention ratio was increased and then decreased and the swollenness ratio became almost constant. In this case, in the case where the heat treatment temperature was 800 deg C. or less, as the heat treatment temperature was increased, the discharge capacity retention ratio was increased.

Accordingly, it was confirmed that in the secondary battery of the embodiment of the invention, in the case where the heat treatment temperature was changed, the cycle characteristics and the swollenness characteristics were improved as well. It was also confirmed that in this case, in the case where the heat treatment temperature was increased in the range of 800 deg C. or less, the cycle characteristics were further improved.

Examples 7-1 to 7-3

A procedure was performed in the same manner as that of Example 6-3, except that the content of the anode binder in the anode active material layer 54B was changed to 30 wt % (Example 7-1), 40 wt % (Example 7-2), or 50 wt % (Example 7-3).

The cycle characteristics and the swollenness characteristics for the secondary batteries of Examples 7-1 to 7-3 were examined. The results shown in Table 7 were obtained.

TABLE 7

Anode active material: silicon
Ten point height of roughness profile Rz: 3 μm
Anode utilization: 50%

| | Anode active material | | | Anode binder | | | | Discharge | |
|---|---|---|---|---|---|---|---|---|---|
| | Median size (μm) | Porosity (%) | | Type | Content (wt %) | Heat treatment temperature (deg C.) | Pore diameter of peak (nm) | capacity retention ratio (%) | Swollenness ratio (%) |
| Example 6-3 | 5 | 20 | | PI | 20 | 700 | 700 | 89 | 1.2 |
| Example 7-1 | | | | | 30 | | | 89 | 1.2 |
| Example 7-2 | | | | | 40 | | | 89 | 1.2 |
| Example 7-3 | | | | | 50 | | | 89 | 1.2 |

As shown in Table 7, in the case where the content of the anode binder was changed, results similar to those of Table 1 were obtained as well. That is, in Examples 7-1 to 7-3 in which the pore diameter of the peak was in the range from 30 nm to 10000 nm, both inclusive, a discharge capacity retention ratio and a swollenness ratio equal to those of Example 6-3 were obtained.

Accordingly, it was confirmed that in the secondary battery of the embodiment of the invention, in the case where the content of the anode binder was changed, the cycle characteristics and the swollenness characteristics were improved as well.

Examples 8-1 to 8-3

A procedure was performed in the same manner as that of Examples 1-3, 1-6, and 1-11 except that a polyamide solution was used instead of the polyamic acid solution, and polyamide (PA) was generated as an anode binder.

Examples 8-4 to 8-6

A procedure was performed in the same manner as that of Examples 1-3, 1-6, and 1-11 except that a polyamideimide solution was used instead of the polyamic acid solution, and polyamideimide (PAI) was generated as an anode binder.

Examples 8-7 to 8-9

A procedure was performed in the same manner as that of Examples 1-3, 1-6, and 1-11 except that polyvinylidene fluoride (PVDF) was used instead of the polyimide as an anode binder.

Comparative Examples 3-1 and 3-2

A procedure was performed in the same manner as that of Comparative examples 1-2 and 1-3 except that polyamide was used as an anode binder as in Examples 8-1 to 8-3.

Comparative examples 3-3 and 3-4

A procedure was performed in the same manner as that of Comparative examples 1-2 and 1-3 except that polyamideimide was used as an anode binder as in Examples 8-4 to 8-6.

Comparative Examples 3-5 and 3-6

A procedure was performed in the same manner as that of Comparative examples 1-2 and 1-3 except that polyvinylidene fluoride was used as an anode binder as in Examples 8-7 to 8-9.

The cycle characteristics and the swollenness characteristics for the secondary batteries of Examples 8-1 to 8-9 and Comparative examples 3-1 to 3-6 were examined. The results shown in Table 8 were obtained.

TABLE 8

Anode active material: silicon
Ten point height of roughness profile Rz: 3 μm
Anode utilization: 50%

| | Anode active material layer | | | | | |
|---|---|---|---|---|---|---|
| | Anode active material | | Anode binder | | | Discharge |
| | Median size (μm) | Porosity (%) | Type | Heat treatment temperature (deg C.) | Pore diameter of peak (nm) | capacity retention ratio (%) | Swollenness ratio (%) |

| | Median size (μm) | Porosity (%) | Type | Heat treatment temperature (deg C.) | Pore diameter of peak (nm) | Discharge capacity retention ratio (%) | Swollenness ratio (%) |
|---|---|---|---|---|---|---|---|
| Example 1-3 | 5 | 20 | PI | 400 | 100 | 80 | 2.2 |
| Example 1-6 | | | | | 700 | 85 | 1.2 |
| Example 1-11 | | | | | 10000 | 80 | 1.1 |
| Example 8-1 | | | PA | | 100 | 78 | 3 |
| Example 8-2 | | | | | 700 | 82 | 2 |
| Example 8-3 | | | | | 10000 | 80 | 1.5 |
| Example 8-4 | | | PAI | | 100 | 74 | 4.1 |
| Example 8-5 | | | | | 700 | 79 | 1.9 |
| Example 8-6 | | | | | 10000 | 78 | 1.7 |
| Example 8-7 | | | PVDF | | 100 | 75 | 3.1 |
| Example 8-8 | | | | | 700 | 79 | 1.8 |
| Example 8-9 | | | | | 10000 | 76 | 1.6 |
| Comparative example 1-2 | 5 | 20 | PI | 400 | 25 | 55 | 14 |
| Comparative example 1-3 | | | | | 20000 | 57 | 1 |
| Comparative example 3-1 | | | PA | | 25 | 54 | 14.5 |
| Comparative example 3-2 | | | | | 20000 | 59 | 1.5 |
| Comparative example 3-3 | | | PAI | | 25 | 52 | 15.3 |
| Comparative example 3-4 | | | | | 20000 | 56 | 1.6 |
| Comparative example 3-5 | | | PVDF | | 25 | 51 | 15 |
| Comparative example 3-6 | | | | | 20000 | 53 | 1.6 |

As shown in Table 8, in the case where the anode binder type was changed, results similar to those of Table 1 were obtained as well. That is, in Examples 8-1 to 8-9 in which the pore diameter of the peak was in the range from 30 nm to 10000 nm, both inclusive, compared to in Comparative examples 1-2, 1-3 and 3-1 to 3-6 in which the pore diameter of the peak was under 30 nm or over 10000 nm, a high discharge capacity retention ratio of 70% or more was obtained, and a small swollenness ratio of less than 10% was obtained as in Examples 1-3, 1-6, and 1-11.

In particular, in Examples 1-3, 1-6, 1-11, and 8-1 to 8-9, in the case of using polyimide, polyamide, or polyamideimide, the discharge capacity retention ratio was higher than the case of using polyvinylidene fluoride. Further, in the case of using polyimide, polyamide, or polyamideimide, the discharge capacity retention ratio was higher in this order.

Accordingly, it was confirmed that in the secondary battery of the embodiment of the invention, in the case where the anode binder type was changed, the cycle characteristics and the swollenness characteristics were improved as well. It was also confirmed that in this case, in the case where polyimide, polyamide, or polyamideimide was used, the cycle characteristics were further improved.

Examples 9-1 to 9-3

A procedure was performed in the same manner as that of Example 1-6, except that scale-like artificial graphite (median size was 5 μm) was added as an anode electrical conductor, and the content thereof was 1 wt % (Example 9-1), 5 wt % (Example 9-2), or 10 wt % (Example 9-3).

Examples 9-4 to 9-6

A procedure was performed in the same manner as that of Example 1-6, except that carbon black (median size was 5 μm) was added as an anode electrical conductor, and the content thereof was 1 wt % (Example 9-4), 5 wt % (Example 9-5), or 10 wt % (Example 9-6).

The cycle characteristics and the swollenness characteristics for the secondary batteries of Examples 9-1 to 9-6 were examined. The results shown in Table 9 were obtained.

TABLE 9

Anode active material: silicon
Ten point height of roughness profile Rz: 3 μm
Anode utilization: 50%

| | Anode active material layer | | | | | | | |
|---|---|---|---|---|---|---|---|---|
| | Anode active material | | Anode binder | | Anode electrical conductor | | Pore diameter of peak (nm) | Discharge capacity retention ratio (%) | Swollenness ratio (%) |
| | Median size (μm) | Porosity (%) | Type | Heat treatment temperature (deg C.) | Type | Content (wt %) | | | |
| Example 1-6 | 5 | 20 | PI | 400 | — | — | 700 | 85 | 1.2 |
| Example 9-1 | | | | | Artifical graphite | 1 | | 86 | 1.2 |
| Example 9-2 | | | | | | 5 | | 87 | 1.2 |
| Example 9-3 | | | | | | 10 | | 88 | 1.2 |
| Example 9-4 | | | | | Carbon black | 1 | | 85.5 | 1.2 |
| Example 9-5 | | | | | | 5 | | 86 | 1.2 |
| Example 9-6 | | | | | | 10 | | 87 | 1.2 |

As shown in Table 9, in the case where the anode electrical conductor was added, results similar to those of Table 1 were obtained as well. That is, in Examples 9-1 to 9-6 in which the pore diameter of the peak was in the range from 30 nm to 10000 nm, both inclusive, a high discharge capacity retention ratio of 80% or more was obtained, and a small swollenness ratio of less than 10% was obtained as in Example 1-6.

In particular, in Examples 9-1 to 9-6 in which the anode electrical conductor was added, compared to in Example 1-6 in which the anode electrical conductor was not added, the discharge capacity retention ratio was higher while the swollenness ratio was maintained constant. As the content of the anode electrical conductor was increased, the discharge capacity retention ratio was increased.

Accordingly, it was confirmed that in the secondary battery of the invention, in the case where the anode electrical conductor was added, the cycle characteristics and the swollenness characteristics were improved as well. It was also confirmed that in this case, in the case where the anode electrical conductor was added, the cycle characteristics were further improved.

Examples 10-1 to 10-7

A procedure was performed in the same manner as that of Example 1-6, except that the ten point height of roughness profile Rz of the anode current collector 54A was changed to 0.1 μm (Example 10-1), 0.5 μm (Example 10-2), 1 μm (Example 10-3), 2 μm (Example 10-4), 4 μm (Example 10-5), 6.5 μm (Example 10-6), or 7 μm (Example 10-7).

The cycle characteristics and the swollenness characteristics for the secondary batteries of Examples 10-1 to 10-7 were examined. The results shown in Table 10 and FIG. 17 were obtained.

TABLE 10

Anode active material: silicon
Anode utilization: 50%

| | Anode current collector | Anode active material layer | | | | | Discharge capacity retention ratio (%) | Swollenness ratio (%) |
|---|---|---|---|---|---|---|---|---|
| | Ten point height of roughness profile Rz (μm) | Anode active material | | Anode binder | | Pore diameter of peak (nm) | | |
| | | Median size (μm) | Porosity (%) | Type | Heat treatment temperature (deg C.) | | | |
| Example 10-1 | 0.1 | 5 | 20 | PI | 400 | 700 | 71 | 1.3 |
| Example 10-2 | 0.5 | | | | | | 80 | 1.3 |
| Example 10-3 | 1 | | | | | | 82 | 1.2 |
| Example 10-4 | 2 | | | | | | 84 | 1.2 |
| Example 1-6 | 3 | | | | | | 85 | 1.2 |
| Example 10-5 | 4 | | | | | | 85 | 1.2 |
| Example 10-6 | 6.5 | | | | | | 84 | 1.2 |
| Example 10-7 | 7 | | | | | | 76 | 1.3 |

Figure 17:
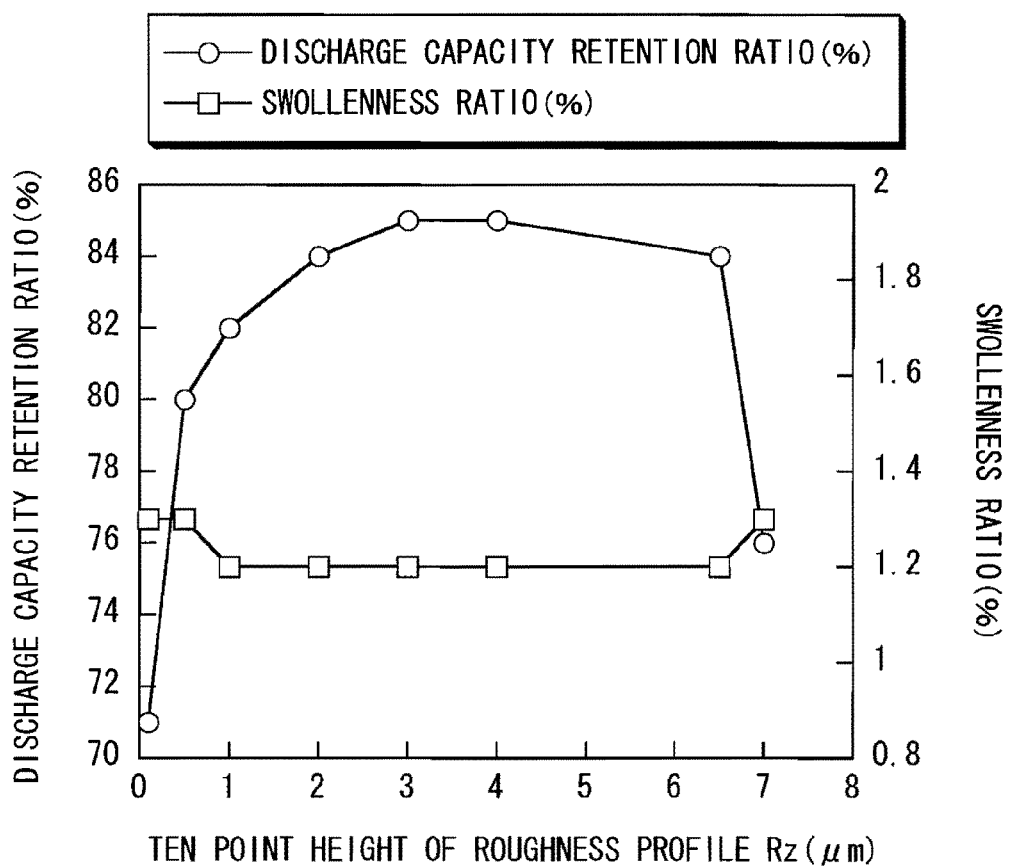
FIG. 17 is a diagram illustrating a relation between ten point height of roughness profile Rz and a discharge capacity retention ratio/a swollenness ratio.

As illustrated in Table 10 and FIG. 17, in the case where the ten point height of roughness profile Rz of the anode current collector 54A was changed, results similar to those of Table 1 were obtained as well. That is, in Examples 10-1 to 10-7 in which the pore diameter of the peak was in the range from 30 nm to 10000 nm, both inclusive, a high discharge capacity retention ratio of 70% or more was obtained, and a small swollenness ratio of less than 10% was obtained as in Example 1-6.

In particular, in Examples 1-6 and 10-1 to 10-7, there was a tendency that as the ten point height of roughness profile Rz was increased, the discharge capacity retention ratio was increased and then decreased and the swollenness ratio became almost constant. In this case, in the case where the ten point height of roughness profile Rz was in the range from 0.5 μm to 6.5 μm, both inclusive, a high discharge capacity retention ratio of 80% or more was obtained.

Accordingly, it was confirmed that in the secondary battery of the embodiment of the invention, in the case where the ten point height of roughness profile Rz of the surface of the anode current collector 54A was changed, the cycle characteristics and the swollenness characteristics were improved as well. It was also confirmed that in this case, in the case where the ten point height of roughness profile Rz was in the range from 0.5 μm to 6.5 μm, both inclusive, the cycle characteristics were further improved.

Example 11-1

A procedure was performed in the same manner as that of Example 1-6, except that as a solvent, 4-fluoro-1,3-dioxolane-2-one (FEC) as a cyclic ester carbonate having halogen represented by Chemical formula 2 was used instead of EC.

Example 11-2

A procedure was performed in the same manner as that of Example 11-1, except that lithium tetrafluoroborate (LiBF$_4$) was added as an electrolyte salt, and sulfobenzoic anhydride (SBAH) as an acid anhydride was added as a solvent. The content of lithium hexafluorophosphate to the solvent was 0.9 mol/kg, the content of lithium tetrafluoroborate to the solvent was 0.1 mol/kg, and the content of SBAH in the solvent was 1 wt %.

Example 11-3

A procedure was performed in the same manner as that of Example 11-2, except that as a solvent, propylene carbonate (PC) was added. The composition of the solvent (PC:FEC:DEC) was 20:30:50 at a weight ratio.

Example 11-4

A procedure was performed in the same manner as that of Example 11-3, except that as a solvent, 4,5-difluoro-1,3-dioxolane-2-one (DFEC) as a cyclic ester carbonate having halogen represented by Chemical formula 2 was added. The composition of the solvent (PC:FEC:DFEC:DEC) was 30:10:10:50 at a weight ratio.

Example 11-5

A procedure was performed in the same manner as that of Example 11-4, except that as a solvent, FEC was not used. The composition of the solvent (PC:DFEC:DEC) was 40:10:50 at a weight ratio.

The cycle characteristics and the swollenness characteristics for the secondary batteries of Examples 11-1 to 11-5 were examined. The results shown in Table 11 were obtained.

TABLE 11

Anode active material: silicon
Ten point height of roughness profile Rz: 3 μm
Anode utilization: 50%

| | Anode active material layer | | | | | | | | | | | Discharge | Swol- |
|---|---|---|---|---|---|---|---|---|---|---|---|---|---|
| | Anode active material | | Anode binder | | | | | | | | | capacity | len- |
| | Median size | Porosity | Type | Heat treatment temperature | Pore diameter of peak | Solvent (wt %) | | | | | Electrolytic solution | retention ratio | ness ratio |
| | (μm) | (%) | | (deg C.) | (nm) | EC | PC | FEC | DFEC | DEC | Electrolyte salt | Other | (%) | (%) |
| Example 1-6 | 5 | 20 | PI | 400 | 700 | 50 | — | — | — | 50 | LiPF$_6$ | — | 85 | 1.2 |
| Example 11-1 | | | | | | — | — | 50 | — | 50 | LiPF$_6$ | — | 86 | 1.1 |
| Example 11-2 | | | | | | — | — | 50 | — | 50 | LiPF$_6$ + LiBF$_4$ | SBAH | 86 | 1.1 |
| Example 11-3 | | | | | | — | 20 | 30 | — | 50 | LiPF$_6$ + LiBF$_4$ | SBAH | 87 | 1.1 |
| Example 11-4 | | | | | | — | 30 | 10 | 10 | 50 | LiPF$_6$ + LiBF$_4$ | SBAH | 87 | 1 |
| Example 11-5 | | | | | | — | 40 | — | 10 | 50 | LiPF$_6$ + LiBF$_4$ | SBAH | 88 | 1 |

As shown in Table 11, in the case where the solvent composition or the type of the electrolyte salt was changed, results similar to those of Table 1 were obtained as well. That is, in Examples 11-1 to 11-5 in which the pore diameter of the peak was in the range from 30 nm to 10000 nm, both inclusive, a high discharge capacity retention ratio of 80% or more was obtained, and a small swollenness ratio of less than 10% was obtained as in Example 1-6.

In particular, in Examples 11-1 to 11-5 in which the cyclic ester carbonate having halogen (FEC or DFEC), the acid anhydride or the like was added as a solvent, or lithium tetrafluoroborate was added as an electrolyte salt, compared to Example 1-6 in which such a solvent or such an electrolyte salt was not added, the discharge capacity retention ratio was higher while the swollenness ratio was kept small. Further, in the case of using the cyclic ester carbonate having halogen, the discharge capacity retention ratio in the case of using DFEC was higher than that in the case of using FEC.

Only the results in the case where the cyclic ester carbonate having halogen represented by Chemical formula 2 was used as a solvent are herein shown, but no results in the case where the chain ester carbonate having halogen shown in Chemical formula 1 was used are herein shown. However, the chain ester carbonate having halogen fulfils a function to increase the discharge capacity retention ratio as the cyclic ester carbonate having halogen does. Thus, it is evident that in the case where the former is used, effect similar to that in the case where the latter is used is obtained as well. The same is applied to a case that the cyclic ester carbonate having an unsaturated bond represented by Chemical formula 5 to Chemical formula 7 or sultone is used.

Further, only the results in the case where lithium hexafluorophosphate or lithium tetrafluoroborate was used as an electrolyte salt are herein shown, but no results in the case where lithium perchlorate, lithium hexafluoroarsenate, or the compound represented by Chemical formula 8 to Chemical formula 10 or Chemical formula 14 to Chemical formula 16 is used are herein shown. However, lithium perchlorate or the like fulfils a function to increase the discharge capacity retention ratio as lithium hexafluorophosphate or the like does. Thus, it is evident that in the case where the former is used, effect similar to that in the case where the latter is used is obtained as well.

Accordingly, it was confirmed that in the secondary battery of the embodiment of the invention, in the case where the solvent composition or the type of the electrolyte salt was changed, the cycle characteristics and the swollenness characteristics were improved as well. It was also confirmed that in this case, in the case where at least one of the chain ester carbonate having halogen represented by Chemical formula 1 and the cyclic ester carbonate having halogen represented by Chemical formula 2; the cyclic ester carbonate having an unsaturated bond represented by Chemical formula 5 to Chemical formula 7; sultone; or an acid anhydride was used as a solvent, the cycle characteristics were further improved. Further, it was also confirmed that in the case where lithium hexafluorophosphate, lithium tetrafluoroborate, lithium perchlorate, lithium hexafluoroarsenate, the compound represented by Chemical formula 8 to Chemical formula 10, or the compound represented by Chemical formula 14 to Chemical formula 16 was used as an electrolyte salt, the cycle characteristics were further improved.

Examples 12-1 to 12-9

A procedure was performed in the same manner as that of Example 1-6, except that the anode utilization was changed to 10% (Example 12-1), 20% (Example 12-2), 30% (Example 12-3), 40% (Example 12-4), 60% (Example 12-5), 70% (Example 12-6), 80% (Example 12-7), 90% (Example 12-8), or 100% (Example 12-9).

The cycle characteristics and the swollenness characteristics for the secondary batteries of Examples 12-1 to 12-9 were examined. The results illustrated in Table 12 and FIG. 18 were obtained.

For the secondary batteries of Examples 1-6 and 12-1 to 12-9, in addition to the cycle characteristics and the swollenness characteristics, the initial charge and discharge characteristics were examined. In examining the initial charge and discharge characteristics, first, to stabilize the battery state, after charge and discharge were performed in the atmosphere at 23 deg C., charge was performed again in the same atmosphere. Thereby, the charge capacity was measured. Subsequently, discharge was performed in the same atmosphere, and thereby the discharge capacity was measured. Finally, initial efficiency (%)=(discharge capacity/charge capacity)× 100 was calculated. The charge and discharge conditions were as follows. That is, after constant voltage charge was performed at the constant current density of 1 mA/cm$^2$ until the current value reached 0.05 mA, discharge was performed at the constant current density of 1 mA/cm$^2$ until the battery voltage reached 1.5 V.

TABLE 12

Anode active material: silicon
Ten point height of roughness profile Rz: 3 μm

| | Anode active material layer | | | | | | | |
|---|---|---|---|---|---|---|---|---|
| | Anode active material | | Anode binder | | | Discharge | | |
| | Median size (μm) | Porosity (%) | Type | Heat treatment temperature (deg C.) | Pore diameter of peak (nm) | Anode utilization (%) | capacity retention ratio (%) | Swollenness ratio (%) | Initial efficiency (%) |
| Example 12-1 | 5 | 20 | PI | 400 | 700 | 10 | 88 | 1.8 | 65 |
| Example 12-2 | | | | | | 20 | 87 | 1.6 | 80 |
| Example 12-3 | | | | | | 30 | 86.5 | 1.3 | 82 |
| Example 12-4 | | | | | | 40 | 86 | 1.3 | 84 |
| Example 1-6 | | | | | | 50 | 85 | 1.2 | 86 |
| Example 12-5 | | | | | | 60 | 84 | 1.2 | 87 |
| Example 12-6 | | | | | | 70 | 84 | 1.2 | 87 |
| Example 12-7 | | | | | | 80 | 83 | 1.1 | 87 |
| Example 12-8 | | | | | | 90 | 76 | 1.1 | 87 |
| Example 12-9 | | | | | | 100 | 72 | 1 | 88 |

Figure 18:
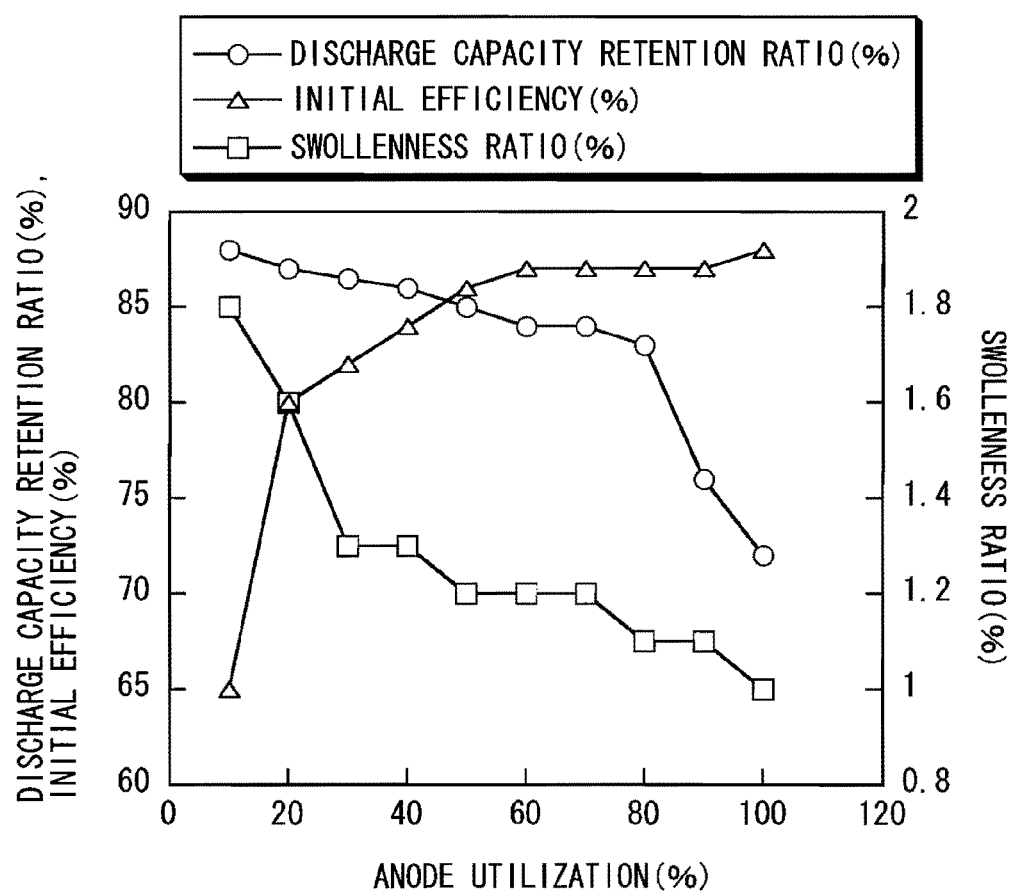
FIG. 18 is a diagram illustrating a relation between an anode utilization and a discharge capacity retention ratio/a swollenness ratio/initial efficiency.

As illustrated in Table 12 and FIG. 18, in the case where the anode utilization was changed, a result similar to the results shown in Table 1 was obtained as well. That is, in Examples 12-1 to 12-9 in which the pore diameter of the peak was in the range from 30 nm to 10000 nm, both inclusive, a high discharge capacity retention ratio of 70% or more was obtained, and a small swollenness ratio of less than 10% was obtained as in Example 1-6.

In particular, in Examples 1-6 and 12-1 to 12-9, there was a tendency that as the anode utilization was increased, the discharge capacity retention ratio and the swollenness ratio were decreased and the initial efficiency was increased. In this case, in the case where the anode utilization was in the range from 20% to 80%, both inclusive, a high discharge capacity retention ratio of 80% or more and a high initial efficiency of 80% or more were obtained.

Accordingly, it was confirmed that in the secondary battery of the embodiment of the invention, in the case where the anode utilization was changed, the cycle characteristics and the swollenness characteristics were improved as well. It was also confirmed that in this case, in the case where the anode utilization was in the range from 20% to 80%, both inclusive, not only superior cycle characteristics and superior swollenness characteristics, but also superior initial charge and discharge characteristics were obtained.

Example 13-1

A procedure was performed in the same manner as that of Example 1-6, except that the square secondary battery illustrated in FIG. 4 and FIG. 5 was manufactured by the following procedure instead of the laminated film secondary battery.

First, after the cathode 21 and the anode 22 were formed, the cathode lead 24 made of aluminum and the anode lead 25 made of nickel were respectively welded to the cathode current collector 21A and the anode current collector 22A. Subsequently, the cathode 21, the separator 23, and the anode 22 were layered in this order, spirally wound in the longitudinal direction, and then formed into a flat shape and thereby the battery element 20 was formed. Subsequently, after the battery element 20 was contained in the battery can 11 made of aluminum, the insulating plate 12 was arranged on the battery element 20. Subsequently, after the cathode lead 24 and the anode lead 25 were respectively welded to the cathode pin 15 and the battery can 11, the battery cover 13 was fixed on the open end of the battery can 11 by laser welding. Finally, the electrolytic solution was injected into the battery can 11 from the injection hole 19, the injection hole 19 was sealed by the sealing member 19A. The square battery was thereby completed.

Example 13-2

A procedure was performed in the same manner as that of Example 13-1, except that the battery can 11 made of iron was used instead of the battery can 11 made of aluminum.

The cycle characteristics for the secondary batteries of Examples 13-1 and 13-2 were examined. The results shown in Table 13 were obtained.

As shown in Table 13, in the case where the battery structure was changed, results similar to those of Table 1 were obtained as well. That is, in Examples 13-1 and 13-2 in which the pore diameter of the peak was in the range from 30 nm to 10000 nm, both inclusive, a high discharge capacity retention ratio of 80% or more was obtained, and a small swollenness ratio of less than 10% was obtained as in Example 1-6.

In particular, in Examples 13-1 and 13-2 in which the battery structure was square type, compared to in Example 1-6 in which the battery structure was laminated film type, the discharge capacity retention ratio was higher and the swollenness ratio was smaller. Further, in the square type, in the case that the battery can 11 was made of iron, the discharge capacity retention ratio was higher and the swollenness ratio was smaller than those of the case that the battery can 11 was made of aluminum.

Though a description has not been given with a specific example, in the case where the package member was the square type made of the metal material, the discharge capacity retention ratio was increased and the swollenness ratio was decreased than in the case where the package member was the laminated film type made of the film. Therefore, it is evident that a similar result is obtained for a cylindrical secondary battery in which the package member is made of a metal material.

Accordingly, it was confirmed that in the secondary battery of the embodiment of the invention, in the case where the battery structure was changed, the cycle characteristics and the swollenness characteristics were improved as well. It was also confirmed that in this case, in the case where the battery structure was the square type or the cylindrical type, both characteristics were further improved.

From the results of Table 1 to Table 13 and FIG. 10 to FIG. 18, it was confirmed that in the secondary battery of the embodiment of the invention, in the case where the anode active material layer containing the anode active material and the anode binder had the plurality of fine pores, and the change rate of mercury intrusion into the plurality of fine pores measured by mercury penetration technique was distributed to show a peak in the pore diameter range from 30 nm to 10000 nm, both inclusive, the cycle characteristics and the swollenness characteristics were improved irrespective of the type of the anode active material, the solvent composition, the type of the electrolyte salt, the battery structure or the like.

TABLE 13

Anode active material: silicon
Ten point height of roughness profile Rz: 3 μm
Anode utilization: 50%

|  | Anode active material layer | | | | | | |
|---|---|---|---|---|---|---|---|
|  | Anode active material | | Anode binder | | | | |
|  | Median size (μm) | Porosity (%) | Type | Heat treatment temperature (deg C.) | Pore diameter of peak (nm) | Battery structure | Discharge capacity retention ratio (%) | Swollenness ratio (%) |
| Example 1-6 | 5 | 20 | PI | 400 | 700 | Laminated film | 85 | 1.2 |
| Example 13-1 |  |  |  |  |  | Square (aluminum) | 87 | 0.6 |
| Example 13-2 |  |  |  |  |  | Square (iron) | 89 | 0.3 |

In particular, a high capacity material such as silicon, that is, a material that is capable of inserting and extracting lithium and that has at least one of metal elements and metalloid elements is easily expanded and shrunk in charge and discharge. Thus, in the secondary battery of the embodiment of the invention, large effect is exercised in the case where the high capacity material such as silicon is used as an anode active material.

The invention has been described with reference to the embodiment and the examples. However, the invention is not limited to the aspects described in the foregoing embodiment and the foregoing examples, and various modifications may be made. For example, use application of the anode of the invention is not limited to the secondary battery, but may be an electrochemical device other than the secondary battery. As other use application, for example, a capacitor and the like are included.

Further, in the foregoing embodiment and the foregoing examples, the description has been given of the lithium ion secondary battery in which the anode capacity is expressed based on insertion and extraction of lithium. However, the secondary battery of the invention is not limited thereto. The invention is similarly applicable to a secondary battery in which the anode capacity includes the capacity associated with insertion and extraction of lithium and the capacity associated with precipitation and dissolution of lithium, and the anode capacity is expressed by the sum of these capacities. In this secondary battery, a material capable of inserting and extracting lithium is used as an anode active material, and the chargeable capacity in the anode material capable of inserting and extracting lithium is set to a smaller value than that of the discharge capacity of the cathode.

Further, in the foregoing embodiment and the foregoing examples, the description has been given with the specific examples of the case in which the battery structure is the square type, the cylindrical type, or the laminated film type, and with the specific example in which the battery element has the spirally wound structure. However, the secondary battery of the invention is similarly applicable to a battery having other battery structure such as a coin type battery and a button type battery or a battery in which the battery element has other structure such as a lamination structure.

Further, in the foregoing embodiment and the foregoing examples, the description has been given of the case using lithium as an electrode reactant. However, as an electrode reactant, other Group 1 element such as sodium (Na) and potassium (K), a Group 2 element such as magnesium (Mg) and calcium (Ca), or other light metal such as aluminum may be used. In this case, the anode material described in the foregoing embodiment may be used as an anode active material as well.

Further, in the foregoing embodiment and the foregoing examples, for the anode and the secondary battery of the invention, the description has been given of the appropriate range derived from the results of the examples (from 30 nm to 10000 nm) for the pore diameter in which the change rate of mercury intrusion into the plurality of fine pores measured by mercury penetration technique shows a peak. However, the description does not totally deny a possibility that the pore diameter is out of the foregoing range. That is, the foregoing appropriate range is the range particularly preferable for obtaining the effects of the invention. Therefore, as long as effect of the invention is obtained, the pore diameter may be out of the foregoing range in some degrees. The same is applied to the pore diameter in which the maximum peak is shown, the porosity of the anode active material layer, the median size of the anode active material, the ten point height of roughness profile Rz of the surface of the anode current collector, the anode utilization and the like.

The present application contains subject matter related to that disclosed in Japanese Priority Patent Application JP 2008-100186 filed in the Japanese Patent Office on Apr. 8, 2008, the entire content of which is hereby incorporated by reference.

It should be understood by those skilled in the art that various modifications, combinations, sub combinations and alternations may occur depending on design requirements and other factors insofar as they are within the scope of the appended claims or the equivalents thereof.

What is claimed is:

1. A secondary battery comprising:
a cathode;
an anode; and
an electrolytic solution,
wherein,
the anode includes an anode collector and an anode active material layer on the anode current collector,
the anode active material layer comprises an anode active material and an anode binder,
the anode active material layer comprises a plurality of fine pores therein,
the anode active material layer has a distribution of a change rate of a mercury intrusion into the plurality of fine pores measured by mercury penetration technique showing a maximum peak in a pore diameter range from and including 1,000 nm to 5,000 nm and
a porosity of the anode active material layer is in the range from and including 4% to 70%.

2. The secondary battery according to claim 1, wherein the change rate of the mercury intrusion into the plurality of fine pores shows a plurality of peaks, and a maximum peak among the peaks exists in a pore diameter range from and including 2,000 nm to 5000 nm.

3. The secondary battery according to claim 1, wherein the anode active material is in a state of a plurality of particles, and a median size thereof is in the range from and including 0.5 μm to 20 μm.

4. The secondary battery according to claim 1, wherein the anode active material is at least one selected from the group consisting of a simple substance of silicon, an alloy of silicon, and a compound of silicon.

5. The secondary battery according to claim 1, wherein the anode active material layer is formed by at least one of coating method and sintering method.

6. The secondary battery according to claim 1, wherein the anode binder is at least one selected from the group consisting of polyimide, polyamide, and polyamideimide.

7. The secondary battery according to claim 6, wherein at least part of the anode binder is carbonized.

8. The secondary battery according to claim 1, wherein ten point height of roughness profile Rz of a surface of the anode current collector is in the range from and including 0.5 μm to 6.5 μm.

9. The secondary battery according to claim 1, wherein the electrolytic solution contains a solvent containing at least one of a chain ester carbonate having halogen represented by Chemical formula 1, a cyclic ester carbonate having halogen represented by Chemical formula 2, a cyclic ester carbonate having an unsaturated bond represented by Chemical formula 3 to Chemical formula 5, sultone, and an acid anhydride chemical formula 1-5 being:

Chemical formula 1

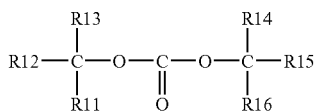

where each of R11 to R16 represent a hydrogen group, a halogen group, an alkyl group, or an alkyl halide group, and at least one of R11 to R16 is the halogen group or the alkyl halide group, Chemical formula 2

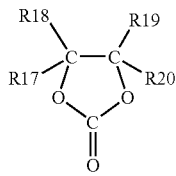

where each of R17 to R20 represent a hydrogen group, a halogen group, an alkyl group, or an alkyl halide group, and at least one of R17 to R20 is the halogen group or the alkyl halide group, Chemical formula 3

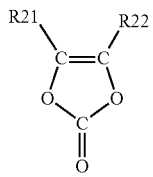

where each of R21 and R22 represent a hydrogen group or an alkyl group,

Chemical formula 4

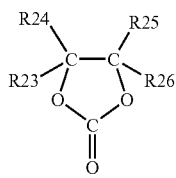

where each of R23 to R26 represent a hydrogen group, an alkyl group, a vinyl group, or an aryl group, and at least one of R23 to R26 represents the vinyl group or the aryl group, and Chemical formula 5

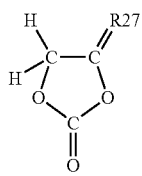

where R27 represent an alkylene group.

10. The secondary battery according to claim 9, wherein (a) the chain ester carbonate having halogen represented by the Chemical formula 1 is fluoromethyl methyl carbonate, bis (fluoromethyl) carbonate, or difluoromethyl methyl carbonate, (b) the cyclic ester carbonate having halogen represented by the Chemical formula 2 is 4-fluoro-1,3-dioxolane-2-one or 4,5-difluoro-1,3-dioxolane-2-one, (c) the cyclic ester carbonate having an unsaturated bond represented by the Chemical formula 3 is vinylene carbonate, (d) the cyclic ester carbonate having an unsaturated bond represented by the Chemical formula 4 is vinylethylene carbonate, and (d) the cyclic ester carbonate having an unsaturated bond represented by the Chemical formula 5 is methylene ethylene carbonate.

11. The secondary battery according to claim 1, wherein the electrolytic solution contains an electrolyte salt containing at least one selected from the group consisting of lithium hexafluorophosphate ($LiPF_6$), lithium tetrafluoroborate ($LiBF_4$), lithium perchlorate ($LiClO_4$), lithium hexafluoroarsenate ($LiAsF_6$), the compounds represented by Chemical formula 6 to Chemical formula 8, and the compounds represented by Chemical formula 9 to Chemical formula 11, chemical formulae 6-11 being:

Chemical formula 6

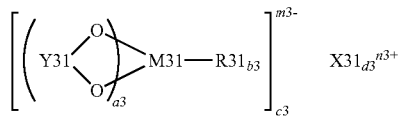

where (a) X31 represents a Group 1 element or a Group 2 element in the long period periodic table or aluminum (Al), (b) M31 represents a transition metal element, a Group 13 element, a Group 14 element, or a Group 15 element in the long period periodic table, (c) R31 represents a halogen group, (d) Y31 represents —(O=)C—R32—C(=O)—, —(O=)C—C(R33)$_2$—, or —(O=)C—C(=O)—, (e) R32 represents an alkylene group, an alkylene halide group, an arylene group, or an arylene halide group, (f) R33 represents an alkyl group, an alkyl halide group, an aryl group, or an aryl halide group, (g) a3 represents one of integer numbers 1 to 4, b3 represents 0, 2, or 4, and c3, d3, m3, and n3 each represent one of integer numbers 1 to 3, Chemical formula 7

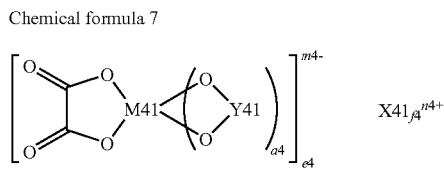

where (a) X41 represents a Group 1 element or a Group 2 element in the long period periodic table, (b) M41 represents a transition metal element, a Group 13 element, a Group 14 element, or a Group 15 element in the long period periodic table, (c) Y41 represents —(O=)C—(C(R41)$_2$)$_{b4}$-C(=O)—, —(R43)$_2$C—(C(R42)$_2$)$_{c4}$-C(=O)—, —(R43)$_2$C—(C(R42)$_2$)$_{c4}$-C(R43)$_2$-, —(R43)$_2$C—(C(R42)$_2$)$_{c4}$-S(=O)$_2$—, —(O=)$_2$S—(C(R42)$_2$)$_{d4}$-S(=O)$_2$—, or —(O=)C—(C(R42)$_2$)$_{d4}$-S(=O)$_2$—, (d) each of R41 and R43 represent a hydrogen group, an alkyl group, a halogen group, or an alkyl halide group, (e) at least one of R41 and/or R43 represents the halogen group or the alkyl halide group, (f) R42 represents a hydrogen group, an alkyl group, a halogen group, or an alkyl halide group, (g) each of a4, e4, and n4 represent 1 or 2, each of b4 and d4 represent one of integer numbers 1 to 4, c4 represents one of integer numbers 0 to 4, and each of f4 and m4 represent one of integer numbers 1 to 3, Chemical formula 8

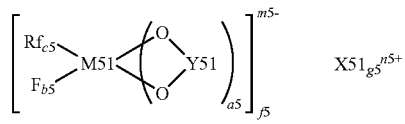

where (a) X51 represents a Group 1 element or a Group 2 element in the long period periodic table, (b) M51 represents a transition metal element, a Group 13 element, a Group 14 element, or a Group 15 element in the long period periodic table, (c) Rf represents a fluorinated alkyl group with the carbon number in the range from and including 1 to 10, or a fluorinated aryl group with the carbon number in the range from and including 1 to 10, (d) Y51 represents —(O═)C—(C(R51)$_2$)$_{d5}$-C(═O)—, —(R52)$_2$C—(C(R51)$_2$)$_{d5}$-C(═O)—, —(R52)$_2$C—(C(R51)$_2$)$_{d5}$-C(R52)$_2$-, -(R52)$_2$C—(C(R51)$_2$)$_{d5}$—S(═O)$_2$-, —(O═)$_2$S—(C(R51)$_2$)$_{e5}$-S (═O)$_2$-, or —(O═)C —(C(R51)$_2$)$_{e5}$—S (═O)$_2$—, (e) R51 represents a hydrogen group, an alkyl group, a halogen group, or an alkyl halide group, (f) R52 represents a hydrogen group, an alkyl group, a halogen group, or an alkyl halide group, and at least one thereof is the halogen group or the alkyl halide group, (g) each of a5, f5, and n5 represent 1 or 2, each of b5, c5, and e5 represent one of integer numbers 1 to 4, d5 represents one of integer numbers 0 to 4, and each of g5 and m5 represent one of integer numbers 1 to 3, and LiN(C$_m$F$_{2m+1}$SO$_2$)(C$_n$F$_{2n+1}$SO$_2$)  Chemical formula 9 where each of m and n represent an integer number of 1 or more,

Chemical formula 10

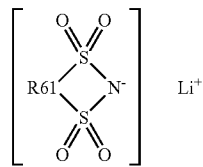

where R61 represents a straight chain or branched perfluoro alkylene group with the carbon number in the range from and including 2 to 4, LiC(C$_p$F$_{2p+1}$SO$_2$)(C$_q$F$_{2q+1}$SO$_2$)(C$_r$F$_{2r+1}$SO$_2$) Chemical formula 11 where each of p, q, and r represent an integer number of 1 or more.

12. The secondary battery according to claim 11, wherein (a) the compound represented by the Chemical formula 6 is a compound represented by Chemical formulas 12(1) to 12(6), (b) the compound represented by the Chemical formula 7 is a compound represented by Chemical formulas 13(1) to 13(8), and (c) the compound represented by the Chemical formula 8 is a compound represented by Chemical formula 14 chemical formulae 12(1) to 12(6), 13(1) to 13(8) and 14 being:

Chemical formula 12

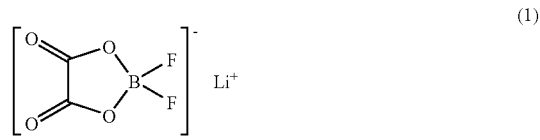
(1)

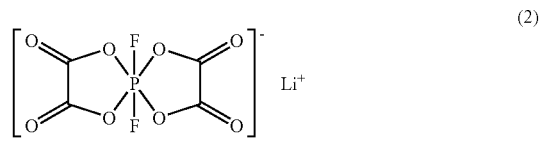
(2)

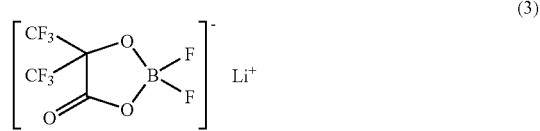
(3)

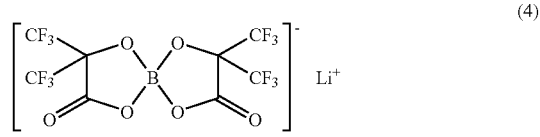
(4)

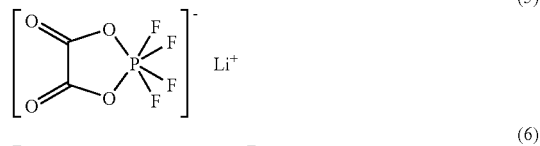
(5)

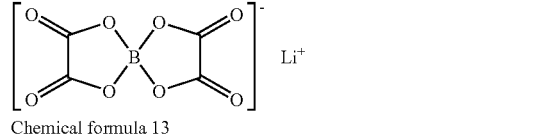
(6)

Chemical formula 13

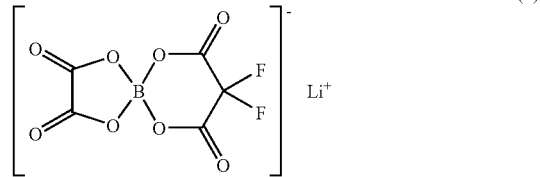
(1)

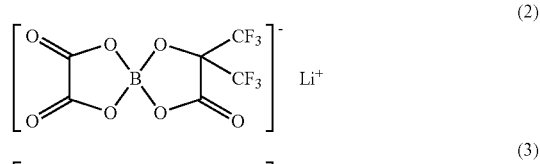
(2)

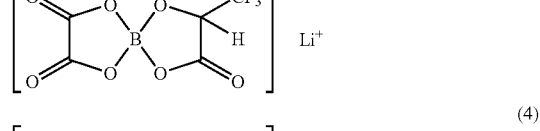
(3)

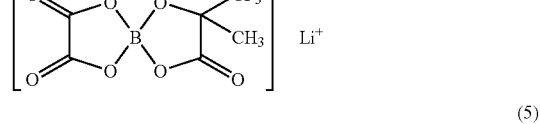
(4)

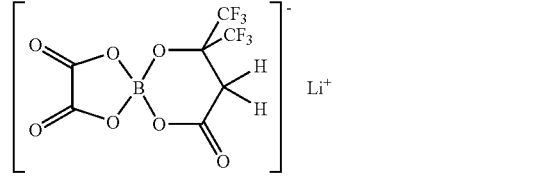
(5)

-continued (6) 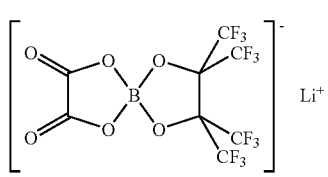

(7) 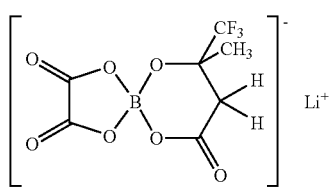

(8) 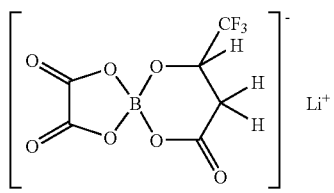

Chemical formula 14

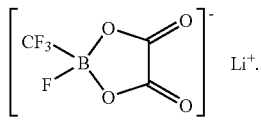

13. The secondary battery according to claim 1, wherein an anode utilization in the full charge state of the anode is in the range from and including 20% to 80%.

14. The secondary battery according to claim 1, wherein the cathode, the anode, and the electrolytic solution are contained in a cylindrical or square package member.

15. The secondary battery according to claim 14, wherein the package member contains iron or an iron alloy.

16. An anode comprising:

a current collector; and an anode active material layer on the current collector, wherein, the anode active material layer comprises an anode active material and an anode binder, the anode active material layer comprises a plurality of fine pores therein, the anode active material layer has a distribution of a change rate of a mercury intrusion into the plurality of fine pores measured by mercury penetration technique showing a peak in a pore diameter range from and including 100 nm to 5,000 nm, and a porosity of the anode active material layer is in the range from and including 4% to 70%.

* * * * *